US008812290B2

(12) United States Patent
Abe

(10) Patent No.: US 8,812,290 B2

(45) Date of Patent: Aug. 19, 2014

(54) TEXT DISPLAY APPARATUS AND RECORDING MEDIUM RECORDING TEXT DISPLAY PROGRAM

(75) Inventor: Takatoshi Abe, Hamura (JP)

(73) Assignee: Casio Computer Co., Ltd, Tokyo (JP)

( * ) Notice: Subject to any disclaimer, the term of this patent is extended or adjusted under 35 U.S.C. 154(b) by 712 days.

(21) Appl. No.: 12/848,368

(22) Filed: Aug. 2, 2010

(65) Prior Publication Data

US 2011/0035207 A1 Feb. 10, 2011

(30) Foreign Application Priority Data

Aug. 7, 2009 (JP) ................................ 2009-184238

(51) Int. Cl.

*G06F 17/27* (2006.01)

*G06F 17/28* (2006.01)

(52) U.S. Cl.

USPC .................................................. 704/2; 704/9

(58) Field of Classification Search

CPC ... G06F 17/28; G06F 17/289; G06F 17/2809; G06F 17/2854; G06F 17/2872

USPC ......................................................... 704/2, 9

See application file for complete search history.

(56) References Cited

U.S. PATENT DOCUMENTS 4,706,212 A * 11/1987 Toma ................................ 704/2
5,136,505 A * 8/1992 Inamori et al. .................... 704/4
5,373,441 A * 12/1994 Hirai et al. ........................ 704/2
5,612,872 A * 3/1997 Fujita ................................ 704/2
5,848,386 A * 12/1998 Motoyama ........................ 704/5
5,873,055 A * 2/1999 Okunishi .......................... 704/2
5,970,460 A * 10/1999 Bunce et al. .................. 704/278
7,895,030 B2 * 2/2011 Al-Onaizan et al. .............. 704/2
8,050,906 B1 * 11/2011 Zimmerman et al. ............ 704/2
8,271,260 B2 * 9/2012 Wong et al. ........................ 704/2
8,296,123 B2 * 10/2012 Thayer et al. ...................... 704/2
2003/0004702 A1 * 1/2003 Higinbotham .................... 704/2

(Continued)

FOREIGN PATENT DOCUMENTS

JP 4-311262 11/1992
JP 5-2606 1/1993

(Continued)

OTHER PUBLICATIONS

Korean Office Action for Korean Application No. 10-2010-0075861 mailed on Sep. 16, 2011.
Japanese Office Action for Japanese Patent Application Serial No. 2009-184238 mailed on May 31, 2011.

*Primary Examiner* — Eric Yen

(74) *Attorney, Agent, or Firm* — Amin, Turocy & Watson, LLP

(57) ABSTRACT

Disclosed is a text display apparatus including: a display section; a dictionary storage section to store dictionary information composed of a headword of a first language corresponded to description information of a second language; a text storage section to store text data of the first language; a text/translation display control section to display text data and to display a portion of the description information as an initial translated word in the second language; a selection section to select a word; a description information display control section to display the description information; and a translated word selection section to select a portion of the description information as a selected translated word, wherein the text/translation display control section includes a selected translated word discrimination display section to replace the initial translated word to display the selected translated word with a display form different from the initial translated word.

3 Claims, 13 Drawing Sheets

1(1A)

(56) References Cited

U.S. PATENT DOCUMENTS

| | | | | |
|---|---|---|---|---|
| 2003/0046058 | A1 * | 3/2003 | Stuckler et al. | 704/7 |
| 2004/0034522 | A1 * | 2/2004 | Liebermann et al. | 704/2 |
| 2006/0100849 | A1 * | 5/2006 | Chan | 704/8 |
| 2008/0228464 | A1 * | 9/2008 | Al-Onaizan et al. | 704/3 |
| 2013/0024181 | A1 * | 1/2013 | Hale et al. | 704/3 |

FOREIGN PATENT DOCUMENTS

| | | |
|---|---|---|
| JP | 07-021189 | 1/1995 |
| JP | 2008-123107 | 5/2008 |
| KR | 20080068913 A | 7/2008 |

* cited by examiner

| HEADWORD | WORD MEANING NUMBER | DESCRIPTION INFORMATION |
|---|---|---|
| a, A | [n.] (1) | 英語アルファベットの… |
| | [n.] (2) | a, A時の表す音; … |
| | ⋮ | ⋮ |
| a1, an | ... | ... |
| ⋮ | ⋮ | ⋮ |
| know | [v.t.] (1) | を知っている |
| ⋮ | | ⋮ |

| WORD IN TEXT | TRANSLATED WORD INFORMATION | |
|---|---|---|
| | HEADWORD | WORD MEANING NUMBER OF TRANSLATION |
| YOU | you | [FIRST] |
| don't | don't | [FIRST] |
| ... | ... | ... |
| a | a1, an | [FIRST] |
| ... | ... | ... |
| without | without | [FIRST] |
| ⋮ | ⋮ | ⋮ |

| WORD IN TEXT | TRANSLATED WORD INFORMATION | | TEXT POSITION | COLOR |
|---|---|---|---|---|
| | HEADWORD | TRANSLATION | | |
| He | he | [FIRST] 彼は | - | BASIC(RED) |
| took | take | Oを…だと思う | MAIN BODY text2: P1L1 | CHANGE1(BLUE) |
| ... | ... | ... | - | ... |
| said | said | [FIRST] sayの過去 | - | BASIC(RED) |
| ... | ... | ... | ... | ... |
| take | take | を手に取る | MAIN BODY text2: P1L5 | CHANGE2(GREEN) |
| ⋮ | ⋮ | ⋮ | ⋮ | ⋮ |

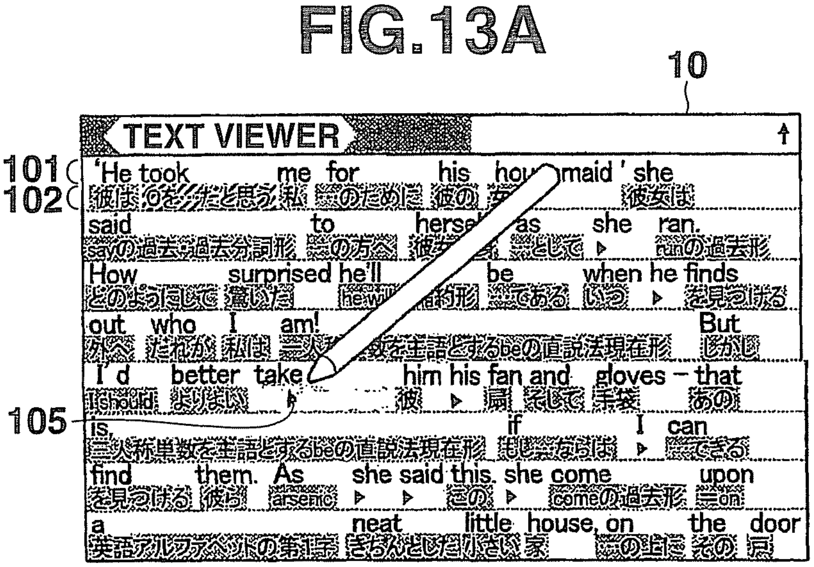

FIG.13A

TEXT VIEWER

'He took me for his housemaid,' she
彼は ○を〜だと思う 私 〜のために 彼の 女中 彼女は
said to herself as she ran.
sayの過去・過去分詞形 〜の方へ 彼女 〜として ▶ runの過去形
How surprised he'll be when he finds
どのようにして 驚いた 〜である いつ ▶ 見つける
out who I am! But
から 〜だが 私は 三人称単数を主語とするbeの直説法現在形 しかし
I'd better take him his fan and gloves – that
I should 取るべき 彼 ▶ 扇 〜して 手袋 あの
is, if I can
三人称単数を主語とするbeの直説法現在形 もしならば ▶ できる
find them. As she said this, she come upon
を見つける 彼ら arsenic ▶ その comeの過去形 〜に
a neat little house, on the door
英語アルファベットの第1字 きちんとした 小さい家 〜の上に その 扉

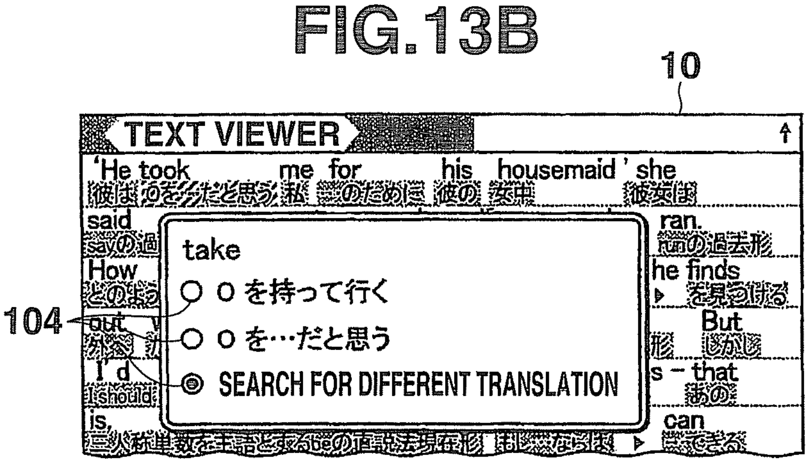

FIG.13B

TEXT VIEWER

'He took me for his housemaid,' she
彼は ○を〜だと思う 私 〜のために 彼の 女中 彼女は
said                                    ran.
sayの過                                   runの過去形 take
○ ○を持って行く
○ ○を…だと思う
◉ SEARCH FOR DIFFERENT TRANSLATION he finds
▶ 見つける
But
しかし
s – that
あの
can
できる

104

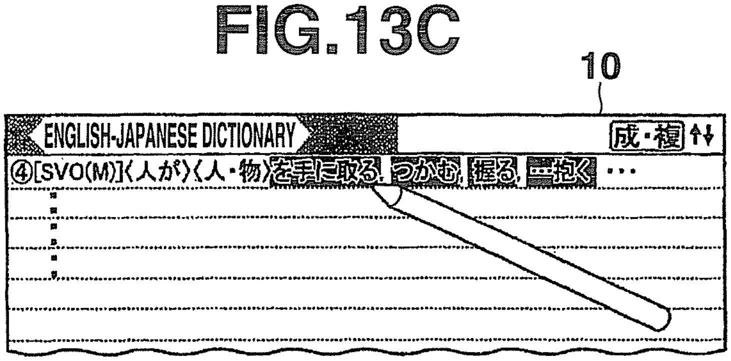

FIG.13C

ENGLISH-JAPANESE DICTIONARY    成・複

④[SVO(M)]〈人が〉〈人・物〉を手に取る, つかむ, 握る, 〜抱く ...

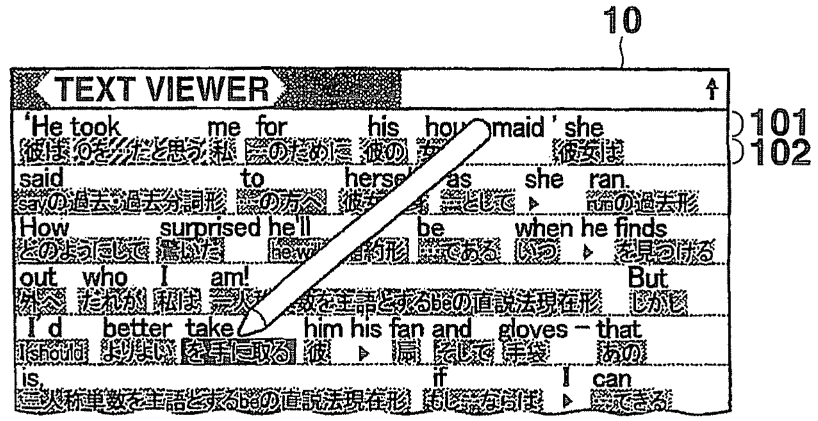

FIG.13D

![Text Viewer screen showing English text with Japanese translations underneath each word/phrase, with a stylus pointing to the text. Labels 101 and 102 point to the text lines.]

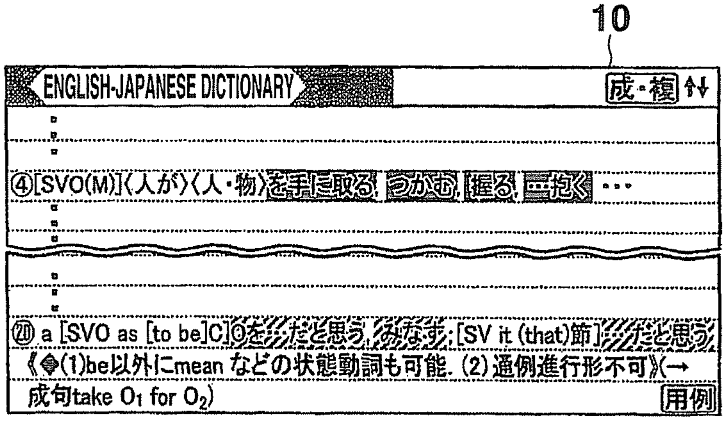

FIG.13E

English-Japanese Dictionary screen showing:

④[SVO(M)]〈人が〉〈人・物〉を手に取る　つかむ　握る　…抱く ···

⑳ a [SVO as [to be]C]Oを…だと思う、みなす；[SV it (that)節]…だと思う
《◆(1)be以外にmean などの状態動詞も可能. (2)通例進行形不可》(→成句take O₁ for O₂)　[用例]

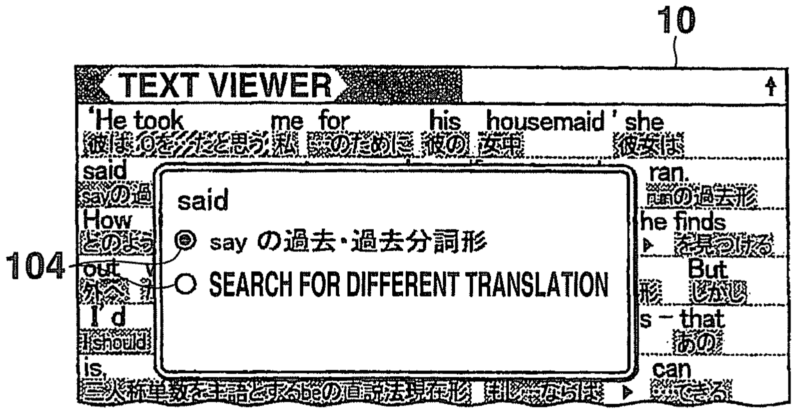

FIG.13F

Text Viewer screen with a popup dialog labeled 104 showing:

said
- say の過去・過去分詞形
- SEARCH FOR DIFFERENT TRANSLATION

TEXT DISPLAY APPARATUS AND RECORDING MEDIUM RECORDING TEXT DISPLAY PROGRAM

BACKGROUND OF THE INVENTION

1. Field of the Invention

The present invention relates to a text display apparatus to search based on a specified headword description information corresponding to the headword and a recording medium recording a text display program.

2. Description of the Related Art

Conventionally, electronic devices such as an electronic dictionary can take in text data of reading material such as a novel from outside to display the data.

Further, in recent electronic devices, when English text data taken in from outside is displayed, translation of each English word can be displayed below each word.

However, according to the above described technique, there are cases where a suitable translation according to the content of the English text is not displayed.

SUMMARY OF THE INVENTION

The present invention has been made in consideration of the above situation, and one of the main objects is to provide a text display apparatus, etc. which can change the displayed translated word of a word in a text.

In order to achieve any one of the above advantages, according to an aspect of the present invention, there is provided a text display apparatus including:

a display section;

a dictionary storage section to store dictionary information composed of a headword of a first language corresponded to description information of a second language;

a text storage section to store text data of the first language;

a text/translation display control section to display text data stored in the text storage section on the display section and to search description information of the headword corresponding to each word in the text data from the dictionary information to display a portion of the description information as an initial translated word in the second language in a position corresponding to each word;

a selection section to select a word of the text data or the translated word displayed on the display section by user operation;

a description information display control section to detect a word corresponding to the selected word or the selected translated word, and to search for description information of a headword corresponding to the word from the dictionary information to display the description information on the display section; and a translated word selection section to select a portion of the description information displayed by the description information display control section as a selected translated word by user operation, wherein the text/translation display control section includes a selected translated word discrimination display section to replace the initial translated word with the selected translated word and to display the selected translated word with a display form different from the initial translated word.

According to another aspect of the present invention, there is provided a recording medium recording a text display program readable by a computer to control a computer of a text display apparatus including a display section, to allow the computer to function as:

a dictionary storage section to store dictionary information composed of a headword of a first language corresponded to description information of a second language;

a text storage section to store text data of the first language;

a text/translation display control section to display text data stored in the text storage section on the display section and to search description information of the headword corresponding to each word in the text data from the dictionary information to display a portion of the description information as an initial translated word in the second language in a position corresponding to each word;

a selection section to select a word of the text data or the translated word displayed on the display section by user operation;

a description information display control section to detect a word corresponding to the selected word or the selected translated word, and to search for description information of a headword corresponding to the word from the dictionary information to display the description information on the display section;

a translated word selection section to select a portion of the description information displayed by the description information display control section as a selected translated word by user operation; and a selected translated word discrimination display section to replace the initial translated word with the selected translated word and to display the selected translated word with a display form different from the initial translated word.

BRIEF DESCRIPTION OF THE DRAWINGS

The present invention and the above-described objects, features and advantages thereof will become more fully understood from the following detailed description with the accompanying drawings and wherein;

FIG. 3 is a diagram showing a data configuration of a dictionary data base;

FIG. 4A is a diagram showing a data configuration of a word/translated word table;

FIG. 4B is a diagram showing a data configuration of a word/translated word table;

FIG. 13A is a diagram showing a display content of the display section;

FIG. 13B is a diagram showing a display content of the display section;

FIG. 13C is a diagram showing a display content of the display section;

FIG. 13D is a diagram showing a display content of the display section;

FIG. 13E is a diagram showing a display content of the display section; and

FIG. 13F is a diagram showing a display content of the display section.

DETAILED DESCRIPTION OF THE PREFERRED EMBODIMENTS

Preferred embodiments for carrying out an electronic apparatus of the present invention in an electronic dictionary will be described in detail with reference to the drawings.

First Embodiment

First, the first embodiment of the preferred embodiments is described.

[Exterior Appearance]

Figure 1:
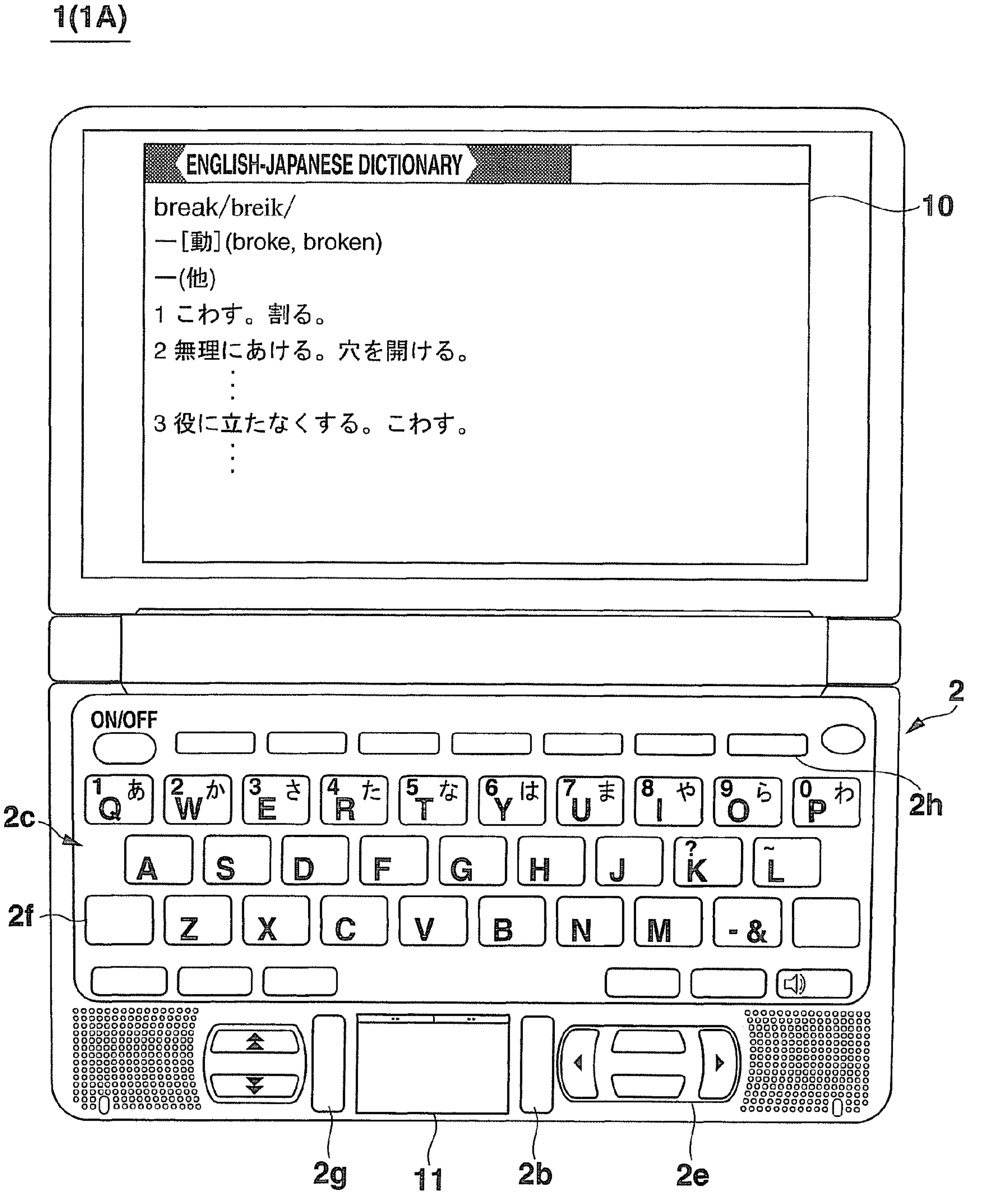
FIG. 1 is a planar view showing an overview of an electronic dictionary.

FIG. 1 is a planar view of the electronic dictionary 1.

As shown in the drawing, the electronic dictionary 1 includes main display 10, sub-display 11 and key group 2.

The main display 10 and the sub-display 11 is a portion to display various data such as characters and reference numerals according to operation of the key group 2 by the user and is composed of a Liquid Crystal Display (LCD), Electronic Luminescence Display (ELD), etc. The main display 10 and the sub-display 11 of the present embodiment are formed together with a so-called touch panel 31 (see FIG. 2) and can receive operation such as hand written input, etc.

The key group 2 includes various keys to receive operation from the user to operate the electronic dictionary 1. Specifically, the key group 2 includes, translate/determine button 2*b*, character keys 2*c*, cursor keys 2*e*, shift key 2*f*, return key 2*g*, text translation key 2*h*, etc.

The translate/determine button 2*b* is a key used to perform searching, to determine the headword, etc. The character keys 2*c* are keys used for input of a character by the user and the present embodiment includes keys “A” to “Z”.

The cursor key 2*e* is a key used to move a highlighted position on the screen, in other words, to move the cursor position, and the like, and in the present embodiment, direction of up, down, left and right can be specified. The shift key 2*f* is a key used when a Japanese word is set as an object of searching, etc. The return key 2*g* is a key used when returning to a screen previously displayed, etc. The text translation key 2*h* is a key used when text data and the translated word are displayed together in a later described text/translation display processing (see FIG. 5 to FIG. 6), etc.

[Internal Configuration]

Figure 2:
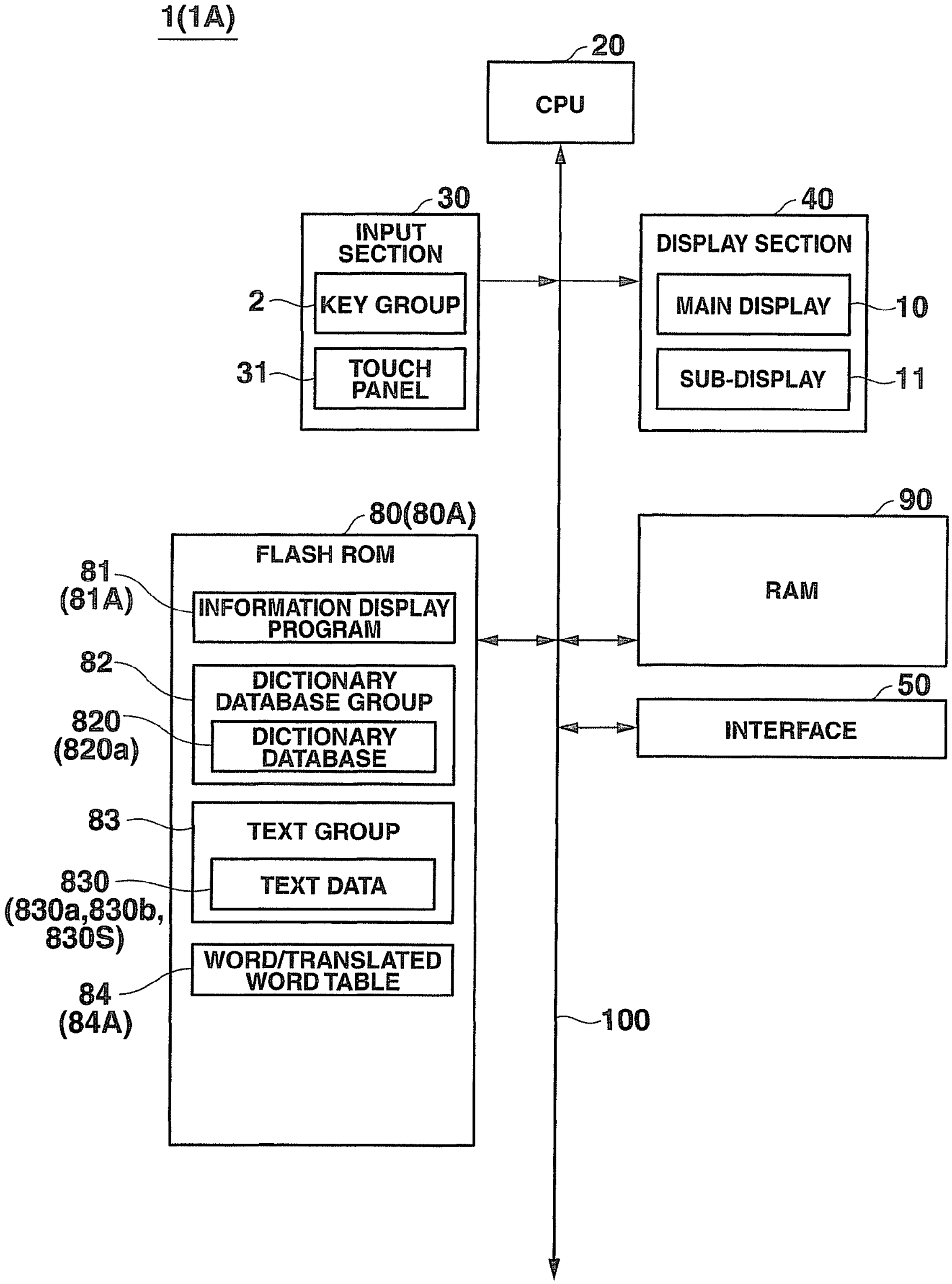
FIG. 2 is a block diagram showing an internal configuration of the electronic dictionary.

Next, the internal configuration of the electronic dictionary 1 is described. FIG. 2 is a block diagram showing an internal configuration of the electronic dictionary 1.

As shown in the diagram, the electronic dictionary 1 is composed of a display section 40, an input section 30, an interface 50, a CPU (Central Processing Unit) 20, a flash ROM (Read Only Memory) 80, a RAM (Random Access Memory) 90 and each section is connected through a bus 100 so as to be able to perform data communication with each other.

The display section 40 includes the above described main display 10 and the sub-display 11 and various pieces of information are displayed on the main display 10 and the sub-display 11 based on the display signal input from the CPU 20.

The input section 30 includes the above-described key group 2 and the touch panel 31 and the signal corresponding to the position of the pressed key or touch panel 31 is output to the CPU 20.

The interface 50 is a connection terminal to connect to the external device which is not shown and in the present embodiment, text data can be received from the server (not shown) on the Internet.

The CPU 20 performs processing based on a predetermined program according to an input instruction, performs instruction and transfer of data to each functional section, and the like and generally controls the electronic dictionary 1. Specifically, the CPU 20 reads various programs stored in the flash ROM 80 according to an operation signal, etc. input from the input section 30 and performs processing according to the program. Then, the CPU 20 stores the processing result in the RAM 90 and flash ROM 80 and outputs the processing results on the display section 40 as necessary.

The flash ROM 80 is a memory to store a program or data to enable various functions of the electronic dictionary 1. According to the present embodiment, the flash ROM 80 stores an information display program 81 of the present embodiment, dictionary database group 82, text group 83, word/translated word table 84, etc.

The information display program 81 is a program to allow the CPU 20 to perform the later described text/translation display processing (see FIG. 5 to FIG. 6).

The dictionary database group 82 includes a plurality of types of dictionary databases 820 and so on and the present embodiment includes a dictionary database 820*a* of an English-Japanese dictionary, etc. These dictionary databases 820 and so on store a plurality of headword information as shown in an example of FIG. 3, and in each piece of headword information, the headword is corresponded with description information including meanings divided for each word meaning.

The text group 83 includes a plurality of types of text data 830 and so on and the present embodiment includes English text data 830*a* concerning “The Adventures of Tom Sawyer” (see FIG. 7A) and English text data 830*b* concerning “Alice’s Adventures in Wonderland” (see FIG. 11A) and the like. Such text data 830 can be stored by default in the flash ROM 80 or read through the interface 50.

As shown in FIG. 4A, the word/translated word table 84 stores a word in a language (first language) in the text data 830 corresponding with information concerning translated word of the word in another language (second language) (hereinafter referred to as translated word information). Here, the word/translated word table 84 of the present embodiment stores the word in English corresponding with the translated word information in Japanese. Also, the word/translated word table 84 stores position information of the translated word as translated word information. Specifically, the word/translated word table 84 stores the headword which corresponds to the English word in the text data 830 and which is stored in the dictionary database 820*a* of the English-Japanese dictionary and one number of any one of the word meanings among the description information in Japanese concerning the headword.

The RAM 90 includes a memory area to temporarily hold various programs performed by the CPU 20, data concerning performing the program, and the like.

[Operation]

Next, the operation of the electronic dictionary 1 will be described with reference to FIG. 5 and FIG. 6.

Figure 5:
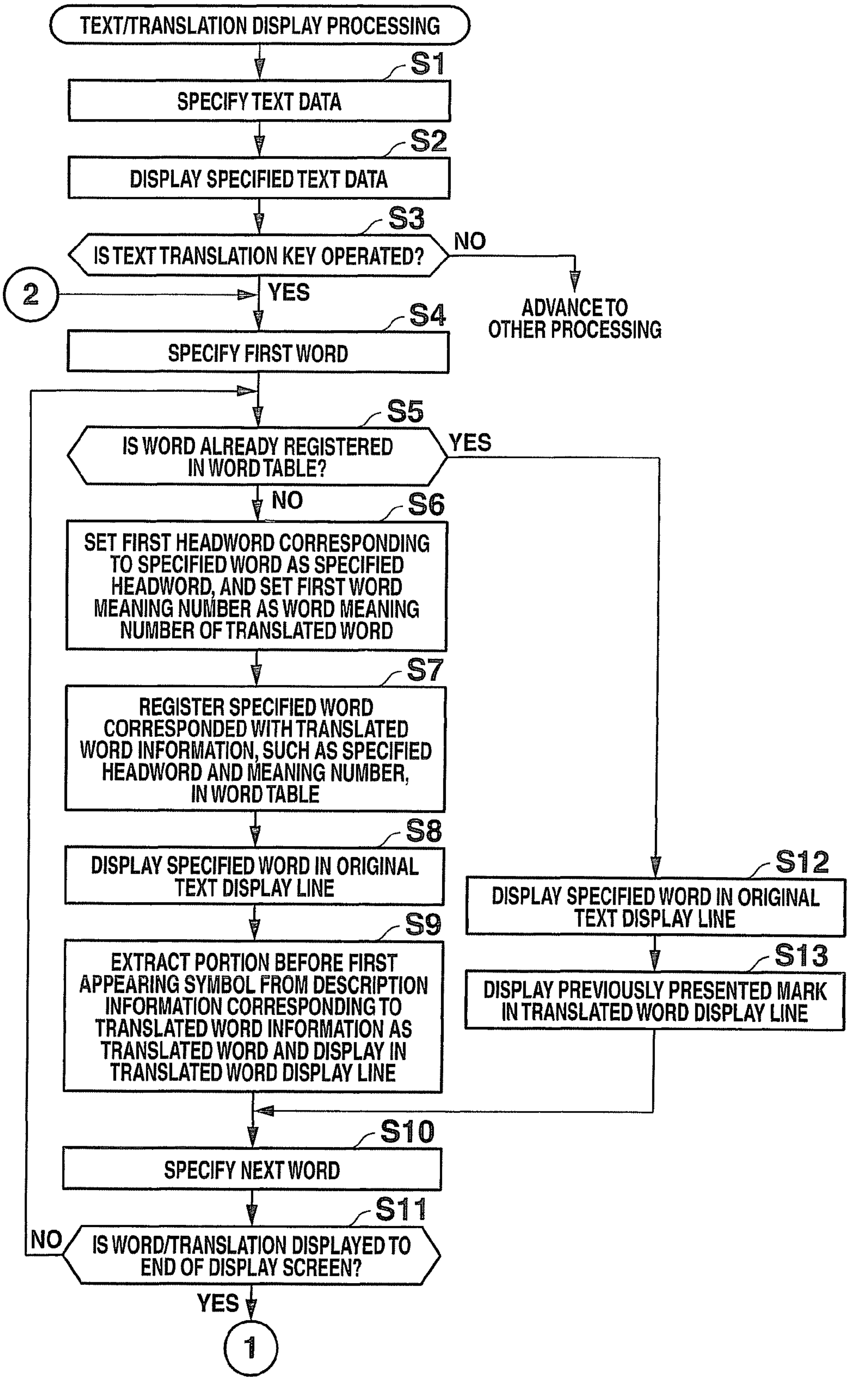
FIG. 5 is a flowchart showing a text/translation display processing.
Figure 6:
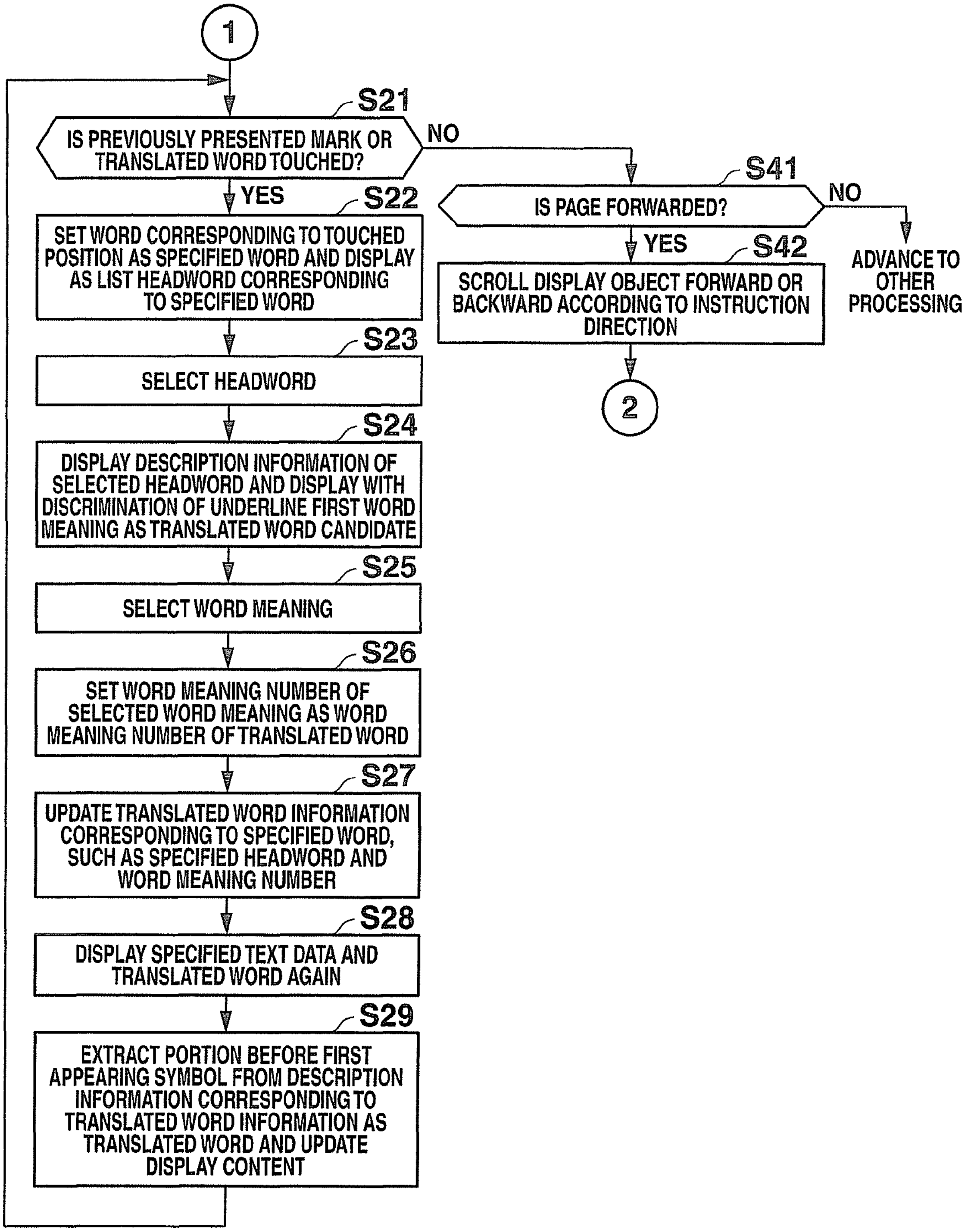
FIG. 6 is a flowchart showing a text/translation display processing.

FIG. 5 and FIG. 6 are flowcharts showing a flow of text/translation display processing performed by the CPU 20 by reading the information display program 81.

First, as shown in FIG. 5, when the text/translation display processing is performed, the CPU 20 displays in a list on the main display 10 the title of the text data 830 in the text group 83 and the user specifies any one of the text data 830 as specified text data (hereinafter referred to as specified text data 830S) (step S1).

Next, after the CPU 20 displays the specified text data 830S on the main display 10 (step S2), the CPU 20 determines whether or not the text translation key 2*h* is operated (step S3) and when it is determined that the text translation key 2*h* is not operated (step S3; No), the processing advances to other processing.

When it is judged that the text translation key 2*h* is operated in step S3 (step S3; Yes), as shown in the later described FIG. 7B, etc., the CPU 20 alternately forms an original text display line 101 to display a string of characters in English (first language) and a translated word display line 102 to display a string of characters in Japanese (second language) on the display screen of the main display 10 and sets the word to be displayed first in the original text display line 101 as the specified word (step S4). In the present embodiment, the original text display line 101 and the translated word display line 102 are formed alternately vertically.

Next, the CPU 20 judges whether or not a word which is the same type as the specified word is already registered in the word/translated word table 84, in other words, whether or not the specified word has already appeared in the specified text data 830S (step S5). In the present embodiment, same type of word means the corresponding headword in the dictionary database 820 is the same, for example a countable noun in singular form replaced by a plural form. Therefore, for example "take" and "took" have different corresponding headwords, and therefore are not considered to be the same type of word.

When it is judged in step S5 that a same type of word as the specified word is not registered in the word/translated word table 84 (step S5; NO), the CPU 20 searches the headword included first in the dictionary database 820*a* among the headwords corresponding to the specified word, sets the headword as the specified headword and sets the first word meaning number of the specified headword as the word meaning number of the translated word (step S6).

Next, the CPU 20 registers the specified word corresponding to the translated word information (specified headword and word meaning number of the translated word) in the word/translated word table 84 (step S7).

Next, the CPU 20 displays the specified word on the original text display line 101 (step S8). Also, based on the information in the word/translated word table 84, the CPU 20 reads out the description information of the first word meaning number among the description information of the specified headword corresponding to the specified word from the dictionary database 820*a*, deletes the portion after the symbol that first appears such as "," (comma), "." (period), ";" (semicolon), ":" (colon), etc., to extract the remaining portion of the description information as the translated word of the specified word, and displays the extracted portion at a position near the specified word in the translated word display line 102 (step S9).

Here, when the previous word in the specified text data 830S is already displayed in the original text display 101 by repeating the processing from the step S5 to a later described step S11, the CPU 20 displays the specified word after the word in the processing of the step S8. Also, when the translated word of the previous word is already displayed in the translated word display line 102, the CPU 20 adjusts the display position of the specified word to the left or right according to the length of the translated word and adjusts the space between the previous word and the specified word. With this, instead of the translated word of the previous word, only the translated word of the specified word is displayed in a position near the specified word.

Next, after the CPU 20 sets the next word in the specified text data 830S as the specified word (step S10), the CPU 20 judges whether or not a word or translated word is displayed to the end of the display position on the main display 10 (step S11) and when it is judged that it is not displayed (step S11; No), the processing advances to the above described step S5.

Then, after the processing of steps S5 to S11 is repeated and the processing of step S7 is performed a plurality of times, when it is judged in the above described step S5 that the same type of word as the specified word is registered in the word/translated word table 84 (step S5; Yes), the CPU 20 displays the specified word in the original text display line 101 as in the above described step S8 (step S12). Also, the CPU 20 displays a previously presented mark 105 (see FIG. 7B) showing that it is a second or more time that the specified word appeared, in a position near the specified word in the translated word display line 102 (step S13). With this, the previously presented word of the same type which appears the second or more time in the specified text data 830S, is displayed with the previously presented mark 105 in the corresponding position instead of the translated word.

Also, when it is judged in step S11 that the word or the translated word is displayed to the end of the display position on the main display 10 (step S11; Yes), as shown in FIG. 6, the CPU 20 judges whether or not the previously presented mark 105 or the translated word portion in the translated word display line 102 is touched (step S21). In the present embodiment, when the translated word portion is touched, the translated word is selected as an object of change. Also, when the previously presented mark 105 is touched, the translated word replaced by the previously presented mark 105 is selected as the object of change.

When it is judged in step S21 that the previously presented mark 105 or the translated word portion is touched (step S21; Yes), the CPU 20 sets the word of the position corresponding to the touched position, or more specifically, the word closest to the touched position among the words in the original text display line 101 as the specified word and searches the headword corresponding to the specified word from the dictionary database 820*a* to display in a list on the main display 10 (step S22). In the present embodiment, as shown in a later described FIG. 8B, after the CPU 20 forms the list display column 106 of the headword on the left side of the main display 10 and the preview display column 107 of the description information on the right side of the main display 10, the CPU 20 highlights the headword specified by the cursor and displays its description information in the preview display column 107.

Next, when the user selects any of the headwords from the headwords displayed in the list as the selected headword (step S23), the CPU 20 searches the description information of the selected headword from the dictionary database 820*a* and displays the description information on the main display 10, and displays with discrimination the first word meaning as a candidate of the translated word (step S24). The CPU 20 changes the candidate of the translated word according to operation of the cursor key 2*e*, etc. and displays with discrimination the word meaning after the change. As a method to display with discrimination, an underline can be added or display can be in bold type.

Next, when any of the word meaning is selected by the user from the word meanings in the description information (step S25), the CPU 20 sets the word meaning number of the selected word meaning to a word meaning number of the translated word after change (step S26). In the present embodiment, when the word meaning is selected in step S25, the portion in the description information of the word meaning before the first symbol which appears is selected as the translated word after change.

Next, the CPU 20 updates the translated word information (specified headword and word meaning number of the translated word) corresponding to the specified word in the word/translated word table 84 (step S27). In step S27, when there is the same type of word as the specified word in the specified text data 830S, the information corresponding to the word can be updated. When only information corresponding to the specified word is updated, the translated word of each word can be changed individually, and when both the specified word and the information corresponding to the same type of word are updated, the translated word of the word of the same type can be collectively changed.

Next, the CPU 20 returns the display content of the main display 10 to the state of step S21 and displays the specified text data 830S and the translated word (step S28).

Next, based on the translated word information corresponding to the specified word in the word/translated word table 84, after the CPU 20 reads out the description information of the word meaning number of the translated word among the description information of the specified headword from the dictionary database 820*a*, the CPU 20 deletes the portion after the first symbol which appears such as "," (comma), "." (period), ";" (semicolon), ":", etc. and extracts the remaining portion of the description information as the translated word of the specified word to update the display content of the main display 10 (step S29) and the processing advances to the above described step S21. Specifically, the CPU 20 of step S29 replaces and changes the content of the translated word of the specified word and adjusts to the left or the right the display position of the words after the specified word according to the length of the translated word after change to adjust the space between the previous word and the specified word.

Also, when it is judged in the above described step S21 that the previously presented mark 105 or the translated word portion is not touched (step S21; No), the CPU 20 judges whether or not the page forwarding operation is performed (step S41) and when it is judged that it is not performed (step S41; No), the process advances to another processing.

When it is judged in step S41 that the page forwarding operation is performed (step S41; Yes), after the CPU 20 scrolls the display object portion of the specified text data 830S forward or backward according to the instructed direction (step S42), as shown in FIG. 5, the operation advances to the above described step S4. In step S42, the information in the word/translated word table 84 can be reset.

Operation Example

Next, the above described text/translation display processing is specifically described.

Figure 7A:
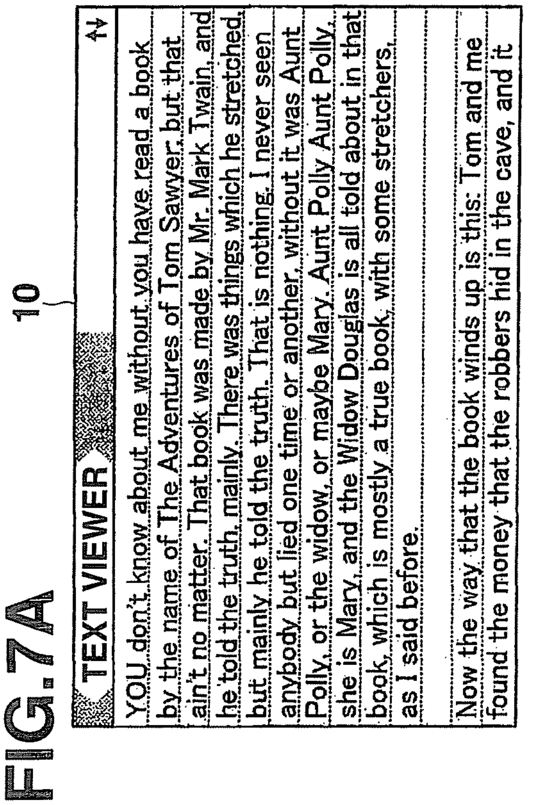
FIG. 7A is a diagram showing a display content of a display section.

First, as shown in FIG. 7A, when the English text data 830*a* of "The Adventures of Tom Sawyer" is specified as the specified text data 830S (step S1), the specified text data 830S is displayed on the main display 10 (step S2).

Figure 7B:
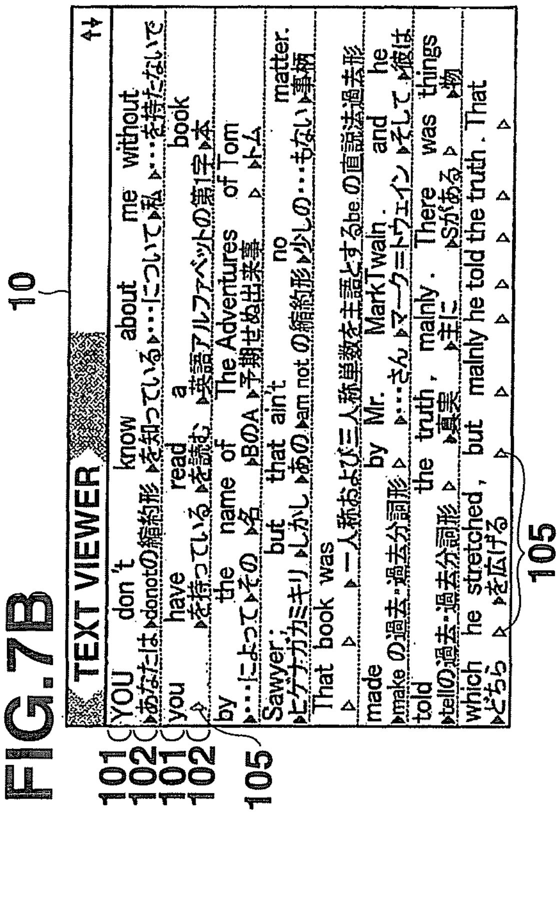
FIG. 7B is a diagram showing a display content of the display section.

Next, when the text translation key 2*h* is operated (step S3; Yes), the word "YOU" which is to be displayed first is set as the specified word (step S4) and it is judged that the specified word "YOU" is not registered yet in the word/translated word table 84 (step S5; No). Next, the first headword "you" corresponding to the specified word "YOU" is searched from the dictionary database 820*a* of the English-Japanese dictionary, the headword is set as the specified headword and after the first word meaning number "first" is set as the word meaning number of the translated word (step S6), these are registered in the word/translated word table 84 corresponded to the specified word "YOU" (step S7, see first row of FIG. 4A). Then, as shown in FIG. 7B, the specified word "YOU" is displayed on the original text display line 101 (step S8). Also, among the description information of the specified headword "you" corresponding to the specified word "YOU", the description information of the first word meaning number is read out from the dictionary database 820*a*, and the description information "あなたは" (meaning "you") in the portion before the symbol which first appears is extracted as the translated word of the specified word "YOU" and is displayed in a position near the specified word "YOU" in the translated word display line 102 (step S9).

Next, the next word "don't" of the specified text data 830S is set as the specified word (step S10) and is judged that the specified word "don't" is not yet registered in the word/translated word table 84 (step S5; No). Next, the first headword "don't" corresponding to the specified word "don't" is searched from the dictionary database 820*a* of the English-Japanese dictionary and set as the specified headword and after the first word meaning number "first" is set as the word meaning number of the translated word (step S6), these are registered in the word/translated word table 84 corresponded to the specified word "don't" (step S7, see second row of FIG. 4A). Then, the specified word "don't" is displayed after the already displayed word "YOU" in the original text display line 101 (step 8). Also, the display position of the specified word "don't" is adjusted to the right (later) side according to the length of the translated word of the previous word "YOU" which is "あなたは" and the space between the previous word which is "YOU" and the specified word which is "don't" is adjusted. Also, among the description information of the specified headword "don't" corresponding to the specified word "don't", the description information of the first word meaning number is read out from the dictionary database 820*a* and the description information in the portion before the symbol which first appears which is "do not の縮約形〟 (meaning "contraction of do not") is extracted as the translated word of the specified word "don't" and is displayed in a position near the specified word "don't" in the translated word display line 102 (step S9).

Then, similarly, the word "know", "about", etc. in the specified text data 830S is displayed in the original text display line 101 (step S8) and the translated word is displayed in the translated word display line 102 (step S9) to display the word or the translated word to the end of the display position on the main display 10 (step S11; Yes).

Here, when a word which appears for the second time in the specified text data 830S, for example when "you" is specified as the specified word (step 10), the specified word "you" is judged to be registered in the word/translated word table 84 (step S5; Yes) and the specified word "you" is displayed in the original text display line 101 (step S12) and the previously presented mark 105 is displayed in a position near the specified word "you" in the translated word display line 102 (step S13).

Figure 7C:
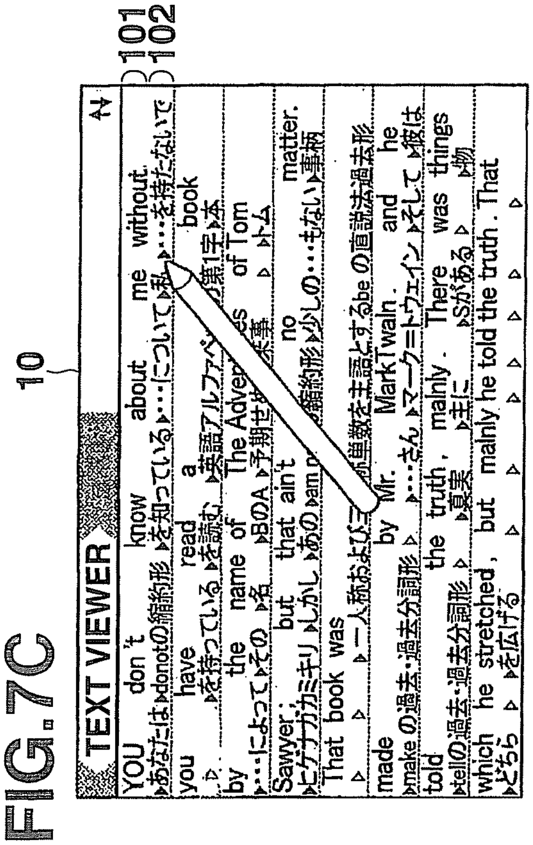
FIG. 7C is a diagram showing a display content of the display section.
Figure 7D:
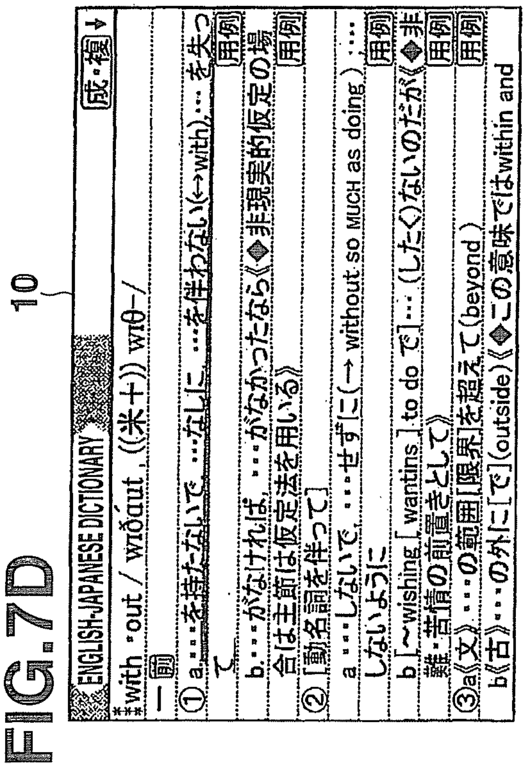
FIG. 7D is a diagram showing a display content of the display section.

Next, as shown in FIG. 7C and FIG. 7D, when the translated word of the word "without" which is 〝を持たないで〟 (meaning "not holding") is touched (step S21; Yes), after the word "without" of the corresponding position of the touched position is set as the specified word, the corresponding headword is searched in the dictionary database 820*a* to display in a list (step S22), and then when the headword "without" is selected as the selected headword (step S23), the description information of the selected headword "without" is searched from the dictionary database 820*a* to be displayed on the main display 10 and the first word meaning is displayed with discrimination of an underline as the candidate of the translated word (step S24).

Figure 8A:
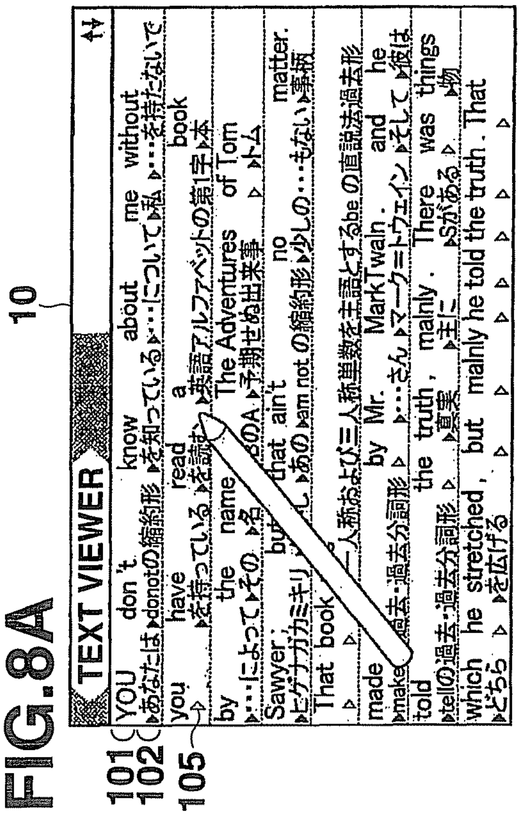
FIG. 8A is a diagram showing a display content of the display section.
Figure 8B:
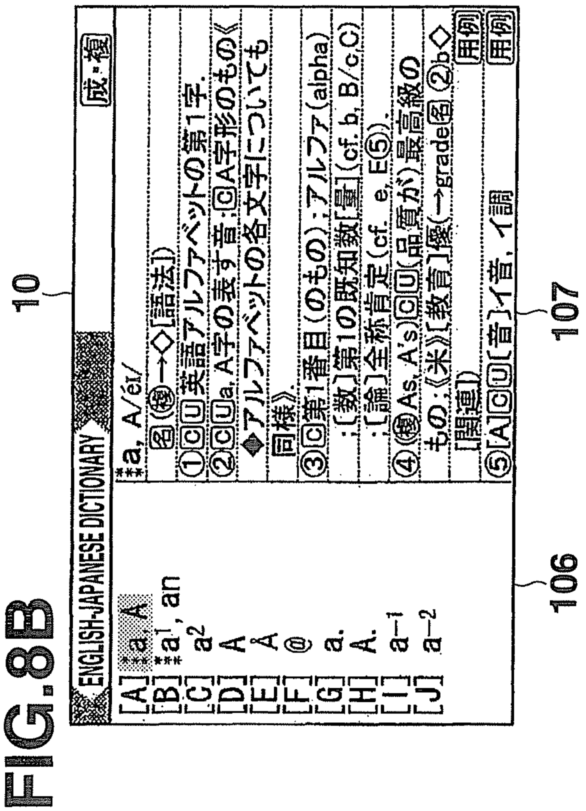
FIG. 8B is a diagram showing a display content of the display section.

Next, as shown in FIG. 8A and FIG. 8B, the return key 2*g* is operated to return the display content of the main display 10 to the state of FIG. 7C. Then, when the translated word of the word "a" which is 〝英語アルファベットの第１字〟 (meaning "the first letter in the English alphabet") is touched (step S21; Yes), the word "a" of the position corresponding to the touched position is set as the specified word and the corresponding headwords "a, A", "$a^1$, an", etc. are searched from the dictionary database 820*a* to be displayed in a list (step S22). FIG. 8B shows a status where among the headwords displayed in the list, the first headword "a, A" is specified with the cursor and the description information is displayed as a preview.

Figure 8C:
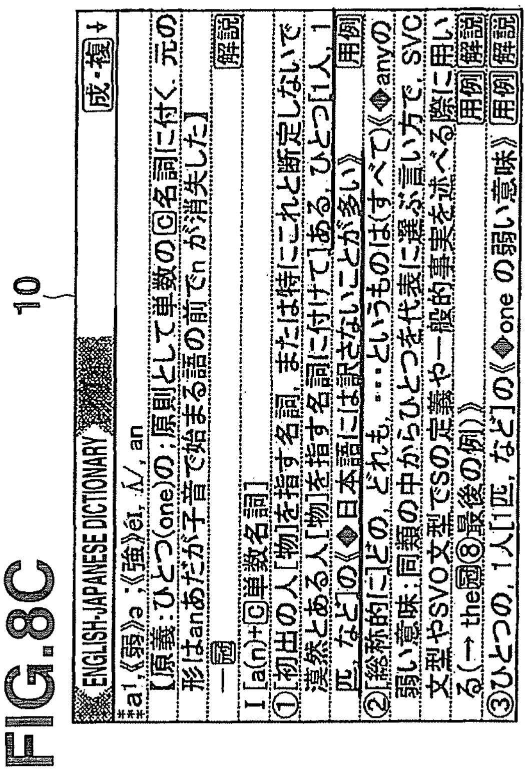
FIG. 8C is a diagram showing a display content of the display section.

Next, when the headword "$a^1$, an" is selected as the selected headword (step S23), as shown in FIG. 8C, the description information of the selected headword "$a^1$, an" is searched from the dictionary database 820*a* to be displayed on the main display 10 and the first word meaning is displayed with discrimination with an underline as the candidate of the translated word (step S24).

Then, when this word meaning is selected by the user (step S25), the selected word meaning "first" is set as the word meaning number of the translated word of the word after change (step S26), the translated word information corresponding to the specified word "a" is updated, and the specified headword is "$a^1$, an" and the word meaning number of the translated word is "first" (step S27, see fourth row of FIG. 4A).

Next, the display content of the main display 10 is returned to the state of FIG. 8A, and the specified text data 830S and the translated word is displayed (step S28).

Figure 8D:
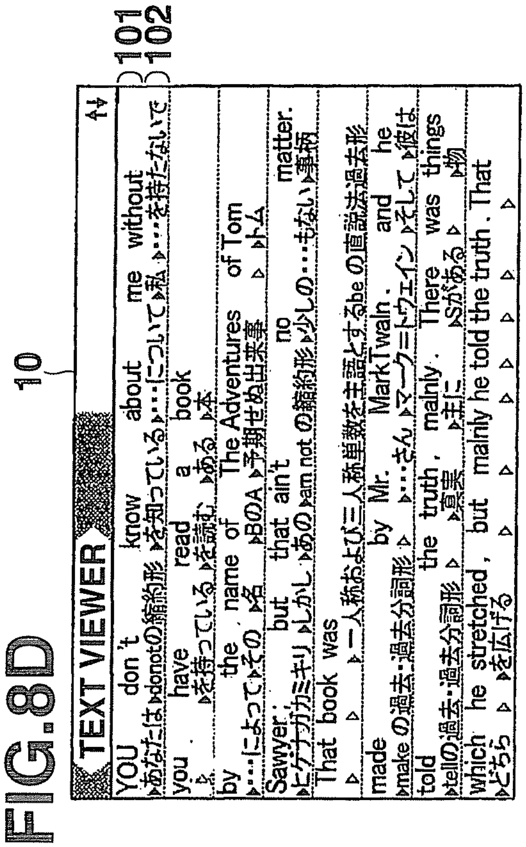
FIG. 8D is a diagram showing a display content of the display section.

Then, as shown in FIG. 8D, based on the information of the word/translated word table 84, among the description information of the specified headword "$a^1$, an" corresponding to the specified word "a", the description information with the word meaning number "first" of the translated word "ある、ひとつ[１人, １匹, など]の . . . " (meaning "one, one thing [one person, one animal, etc.]") is read out from the dictionary database 820*a* and the description information 〝ある〟 of the portion before the first appearing symbol "," is extracted as the translated word of the specified word "a" and the display content of the main display 10 is updated (step S29).

According to the electronic dictionary 1, as shown in steps S1 to S11 in FIG. 5, steps S21 to S24 in FIG. 6, FIG. 7D, FIG. 8C, etc., when the text translation key 2*h* is operated, the English specified text data 830S is displayed and the description information of the headword corresponding to the words of the specified text data 830S is searched from the dictionary database 820*a*, at least a portion of the description information is displayed in the corresponding position of the word as the translated word in Japanese, and when the user selects any of the translated words as the object to be changed in this state, the word displayed in the position corresponding to the translated word of the object to be changed is detected, and the description information of the headword corresponding to the word is searched from the dictionary database 820*a* and displayed, and thus the specific content of the translated word which is the object to be changed can be confirmed with the description information.

Then, as shown in steps S25 to S29 in FIG. 6, FIG. 8, etc., when at least a portion of the description information is selected by the user as the translated word after change, the translated word which is the object to be changed is replaced by the translated word which is the word after change and displayed, and thus the translated word of the word in the specified text data 830S can be changed from the translated word which is the object to be changed to the translated word which is the word after change. Therefore, the word in the text can be changed to the displayed translated word.

As shown in step S21 in FIG. 6, FIG. 8A, etc., the user can select the translated word which is the object to be changed through the touch panel 31, and therefore, compared to selection by operation of a cursor key 2*e*, etc., the selection of the translated word which is the object to be changed becomes easier.

As shown in step S13 in FIG. 5, FIG. 7B, FIG. 8A, etc., based on the word/translated word table 84, the previously presented word of a same type of word which appears for the second or more time in the specified text data 830S is displayed with a previously presented mark 105 showing that it is previously presented instead of the translated word of the word. Therefore, displaying the same translated word each time for the previously presented word can be prevented and the display content can be simplified.

As shown in steps S8 to S9 in FIG. 5, FIG. 7B, FIG. 8A, etc., the original text display line 101 to display the string of English characters and the translated word display line 102 to display the string of Japanese characters are formed alternately on the display screen. The words of the specified text data 830S are displayed in the original text display line 101 and the translated word of each word is displayed in a position near the corresponding word in the translated word display line 102. The space between the words in the original text display line 101 is adjusted according to the length of the translated word in the translated word display line 102 and thus the word and the translated word can be displayed in a close position. Therefore, the content of the translated word for each word can be easily confirmed.

Second Embodiment

Next, the second embodiment of the electronic device of the preferred embodiments is described. As for portions corresponding to the first embodiment which are similar, the same reference numerals are applied and the description is omitted.

[Structure]

As shown in FIG. 2, the flash ROM 80A of the electronic dictionary 1A of the present embodiment includes an information display processing program 81A and a word/translated word table 84A.

The information display processing program 81A is a program to allow the CPU 11 to perform a later described text/translation display processing (see FIG. 9 to FIG. 10).

As shown in FIG. 4B, in addition to the word in the original language (English) in the corresponding text data 830 and the translated word information of the word in another language (Japanese), the word/translated word table 84A stores the information showing a position of the word in the flash ROM 80 (hereinafter referred to as the text word position information) corresponded with a displayed color to highlight display of the translated word (hereinafter referred to as highlight display color). The word/translated word table 84A stores as translated word information a headword corresponding to the English word in the text data 830 and stored in the dictionary database 820*a* of the English-Japanese dictionary and a portion of the content of the Japanese description information of the headword.

[Operation]

Next, the operation of the electronic dictionary 1A is described with reference to FIG. 9 to FIG. 10.

Figure 9:
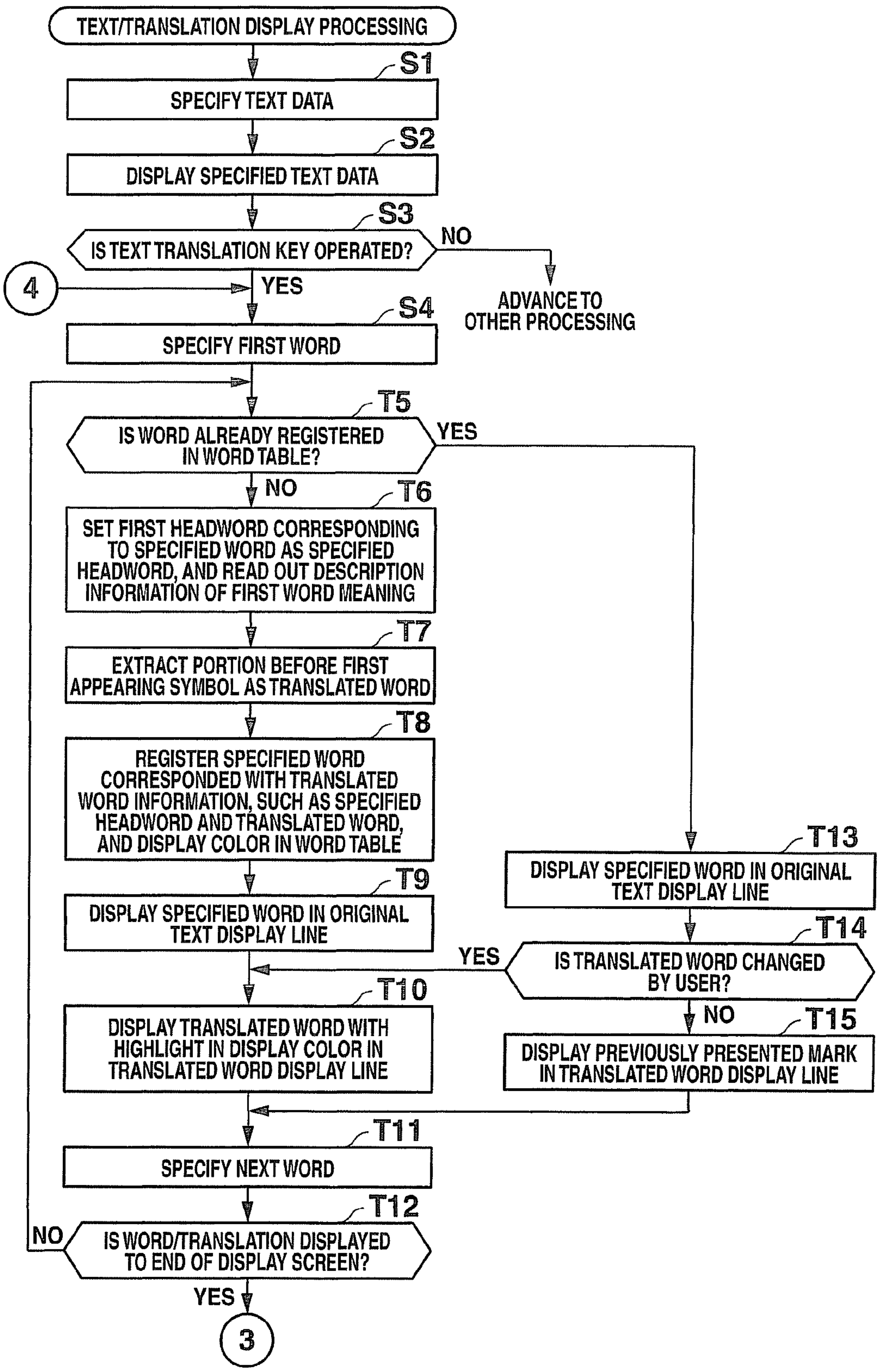
FIG. 9 is a flowchart showing a text/translation display processing.
Figure 10:
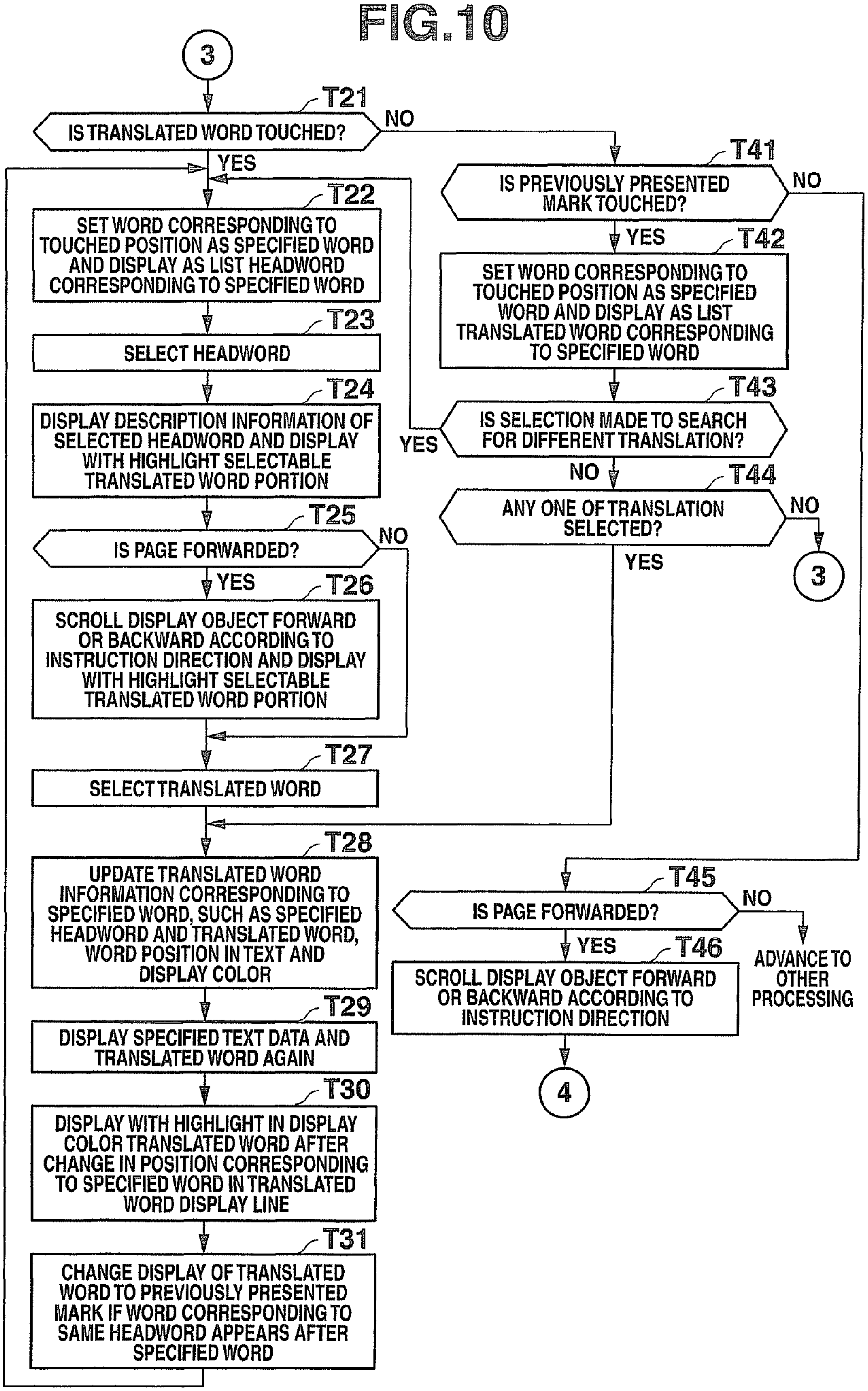
FIG. 10 is a flowchart showing a text/translation display processing.

FIG. 9 to FIG. 10 are flowcharts showing a flow of the text/translation display processing performed by the CPU 20 by reading out the information display program 81A.

First, as shown in FIG. 9, when the text/translation display processing is performed, first the CPU 20 performs the same processing as the steps S1 to S4 in the first embodiment.

Next, the CPU 20 judges whether or not the same type of word as the specified word is registered in the word/translated word table 84, in other words, whether or not the specified word has already appeared (step T5). In the present embodiment, the same type of word is a word where the corresponding headword in the dictionary database 820 is the same, for example, a countable noun in singular form replaced by plural form. Therefore, for example, "take" and "took" have different corresponding headwords and therefore are not considered to be the same type of word.

When it is judged in step T5 that a same type of word as the specified word is not registered in the word/translated word table 84 (step T5; No), among the headwords which correspond to the specified word, the CPU 20 searches the headword included first in the dictionary database 820*a* and sets the headword as the specified headword and reads out the description information of the first word meaning of the specified headword from the dictionary database 820*a* (step T6).

Next, the CPU 20 deletes the portion of the read out description information after the first appearing symbol such as "," (comma), "." (period), ";" (semicolon), ":" (colon) and extracts the remaining portion of the description information as the translated word of the specified word (step T7).

Next, the CPU 20 registers the specified word, the specified headword, the translated word and the default highlight display color of the translated word corresponded to each other in the word/translated word table 84 (step T8). In the present embodiment, the CPU 20 registers the first mark S (see FIG. 4B) to the word/translated word table 84 where the first mark S is added to the translated word to show the first word meaning of the first headword is extracted as the translated word. Also, the CPU 20 uses red as the default highlight display color of the translated word, however, for example, no color or other color can be used.

Next, the CPU 20 displays the specified word in the original text display line 101 (step T9). Also, based on the information in the word/translated word table 84, the CPU 20 displays the translated word corresponding to the specified word with highlight using the highlight display color in a position near the specified word in the translated word display line 102 (step T10).

Here, when the previous word in the specified text data 830S is already displayed in the original text display line 101 by repeating the processing from step T5 to a later described step T12, in the processing of step T9, the CPU 20 displays the specified word after this word. Also, when the translated word of the previous word is already displayed in the translated word display line 102, in the processing of step T9, the CPU 20 adjusts the display position of the specified word to the left or right according to the length of the translated word and adjusts the space between the previous word and the specified word. With this, instead of the translated word of the previous word, only the translated word of the specified word is displayed in the position near the specified word.

Next, the CPU 20 sets the next word in the specified text data 830S as the specified word (step T11) and determines whether or not the word or the translated word is displayed to the end of the display position on the main display 10 (step T12) and when it is judged that it is not displayed (step T12; No), the processing advances to the above described step T5.

Then, when it is judged in the above described step T5 that the same type of word as the specified word is registered in the word/translated word table 84 by repeating the processing of steps T5 to T12 and performing the processing of step T8 a plurality of times (step T5; Yes), the CPU 20 displays the specified word in the original text display line 101 similar to the above described step T9 (step T13).

Next, the CPU 20 judges whether or not the translated word of the specified word is the translated word changed by the user (see later described step T28 in FIG. 10) based on whether or not the first mark S is added to the translated word corresponding to the specified word (step T14) and when it is judged that it is not the translated word after change (step T14; No), the previously presented mark 105 (see FIG. 11B) is displayed in the position near the specified word in the translated word display line 102 (step T15). With this, the previously presented word of the same type which appears the second or more time in the specified text data 830S is displayed with the previously presented mark 105 in the corresponding position instead of the translated word.

When it is judged in step T14 that the translated word of the specified word is the translated word after change (step T14; Yes), in other words, when the first mark S is not added, the processing advances to the above described step T10. With this, even if the word is the same type of word as an already presented word which appears the second or more time in the specified text data 830S, when the user changes the translated word with later described steps T21 to T46 (see FIG. 10), the translated word is displayed instead of the previously presented mark 105.

When it is judged in the above described step T12 that the word or the translated word is displayed to the end of the display position on the main display 10 (step T12; Yes), as shown in FIG. 10, the CPU 20 judges whether or not the translated word portion in the translated word display line 102 is touched (step T21). In the present embodiment, when the translated word portion is touched, the translated word is selected as the object to be changed.

When it is judged in step T21 that the translated word portion is touched (step T21; Yes), the CPU 20 sets the word in the position corresponding to the touched position, more specifically, among the words in the original text display line 101, the word closest to the touched position is set as the specified word and the headword corresponding to the specified word is searched from the dictionary database 820*a* and displayed in a list on the main display 10 (step T22). In the present embodiment, as shown in a later described FIG. 11D, the CPU 20 forms a list display column 106 of the headword on the left side of the main display 10 and a preview display column 107 of the description information on the right side of the main display 10, highlights the headword specified by the cursor and displays the description information in the preview display column 107.

Next, when the user selects any of the headwords from the headwords displayed in the list as the selected headword (step T23), the CPU 20 searches for the description information of the selected headword from the dictionary database 820*a* and displays the description information on the main display 10. The CPU 20 displays with highlight the portion already selected and the portion which can be selected as the translated word among the description information displayed on the main display 10 (step T24). In the present embodiment, the CPU 20 uses a different highlight display color depending on the order of type of translated word the portion of the string of characters in the description information of the selected headword is selected as (or can be selected as) and can be displayed with discrimination. Specifically, when the first type of the translated word is selected and the second type of the translated word is not selected, the CPU 20 uses red (default display color) as the highlight display color of the portion selected as the first type of translated word and uses blue as the highlight display color of the portion which can be selected as the second type of translated word. Also, when the first type and the second type of the translated word is selected and the third type of the translated word is not selected, the CPU 20 uses red as the highlight display color of the portion selected as the first type of the translated word, blue as the highlight display color of the portion selected as the second type of the translated word, and uses green as the highlight display color of the portion which can be selected as the third type of the translated word.

Next, the CPU 20 judges whether or not the page forwarding operation is performed (step T25) and when it is judged that it is not performed (step T25; No), the processing advances to a later described step T27.

Also, when it is judged that the page forwarding operation is performed in step T25 (step T25; Yes), after the CPU 20 scrolls the display object portion of the description information forward or backward according to the instruction direction, similar to the above described step T24, the portion selected and the portion which can be selected as the translated word after change from the description information displayed on the main display 10 are displayed with highlight (step T26).

Next, when the user selects any of the word meanings from the word meanings in the description information (step T27), the CPU 20 updates the word/translated word table 84 to update the translated word information (specified headword and translated word) corresponding to the specified word, the highlight display color of the translated word and the text word position information (step T28). With this, the translated word where the content is changed, the default translated word where the content is not changed (first word meaning) are registered with different highlight display colors and a plurality of translated words corresponding to the same headword are registered with a different highlight display color depending on the content of the translated word. In the present embodiment, when there is the same type of word as the specified word in the specified text data 830S, the CPU 20 in step T28 updates the information corresponding to the word. With this, the translated word of the same type is collectively changed. In step T28, only the information corresponding to the specified word can be updated and in this case the translated word of each word can be individually changed.

Next, the CPU 20 returns the display content of the main display 10 to the state of step T21 and displays the specified text data 830S and the translated word (step T29).

Next, based on the information in the word/translated word table 84, the CPU 20 updates the display content of the main display 10 (step T30). Specifically, based on the text word position information in the word/translated word table 84, the CPU 20 in step T30 replaces and changes the content of the translated word of the specified word and displays with highlight (displays with discrimination) in the corresponding highlight display color and adjusts the display position of the words after the specified word to the left or the right according to the length of the translated word after change and adjusts the spaces between the specified word and the words before and after the specified word. As described above in step T28, in the present embodiment, the translated word where the content is changed and the translated word where the content is not changed is corresponded to different highlight display color in the word/translated word table 84 and thus the translated word where the content is changed is displayed with discrimination in step T30. Further, the plurality of translated words corresponding to the same headword is corresponded to different highlight display color according to the content of the translated word, and thus the plurality of translated words corresponding to the same headword is displayed with discrimination in different highlight display color according to the content of the translated word.

Next, when there is a word corresponding to the headword which is the same as the specified word in a portion after the specified word in the specified text data 830S, the CPU 20 changes the translated word displayed for the word to the previously presented mark 105 (step T31) and then the processing advances to the above described step T21.

When it is judged in the above described step T21 that the translated word portion is not touched (step T21; No), the CPU 20 judges whether or not the previously presented mark 105 is touched (step T41). In the present embodiment, when the previously presented mark 105 is touched, the translated word replaced by the previously presented mark 105 is selected as the object of change.

When it is judged in step T41 that the previously presented mark 105 is touched (step T41; Yes), the CPU 20 sets the word in the position corresponding to the touched position, more specifically, the word closest to the touched position among the words in the original text display line 101, as the specified word, extracts the translated word corresponded to the headword which is the same as the specified word in the word/translated word table 84 to display in a list on the main display 10 and displays a selection button 104 (see FIG. 13B) to select the translated word in a position near each of the translated word (step T42). Also, the CPU 20 displays on the main display 10 a selection button 104 (see FIG. 13B) to search for a translated word different from the translated word displayed in a list.

Next, the CPU 20 judges whether or not the selection button 104 to search for a different translated word is operated (step T43) and when it is judged that it is operated (step T43; Yes), the processing advances to the above described step T22.

Also, when it is judged in step T43 that the selection button 104 to search for the different translated word is not operated (step T43; No), the CPU 20 judges whether or not the selection button 104 to select any of the translated words is operated (step T44). In the present embodiment, when the selection button 104 to select any of the translated words is operated, the corresponding translated word is selected as the translated word after change.

In step T44, when it is judged that the selection button 104 to select any of the translated words is not operated (step T44; No), for example when the return key 2*g* is operated, the CPU 20 advances the processing to the above described step T21 and when it is judged that it is operated (step T44; Yes), the CPU 20 advances the processing to the above described step T28. When the processing advances from step T44 to step T28, in the above described step T30, the previously presented mark 105 corresponding to the specified word is replaced by the translated word after change.

Also, when it is judged in the above described step T41 that the previously presented mark 105 is not touched (step T41; No), the CPU 20 determines whether or not the page forwarding operation is performed (step T45), and when it is judged that it is not performed (step T45; No), the processing advances to another processing.

Also, when it is judged in step T45 that the page forwarding operation is performed (step T45; Yes), after the CPU 20 scrolls the display object portion of the specified text data 830S forward or backward according to the instruction direction, as shown in FIG. 9, the processing advances to the above described step S4.

Operation Example

Next, the above described text/translation display processing is described in detail.

Figures 11A, 11B, 11C, 11D:
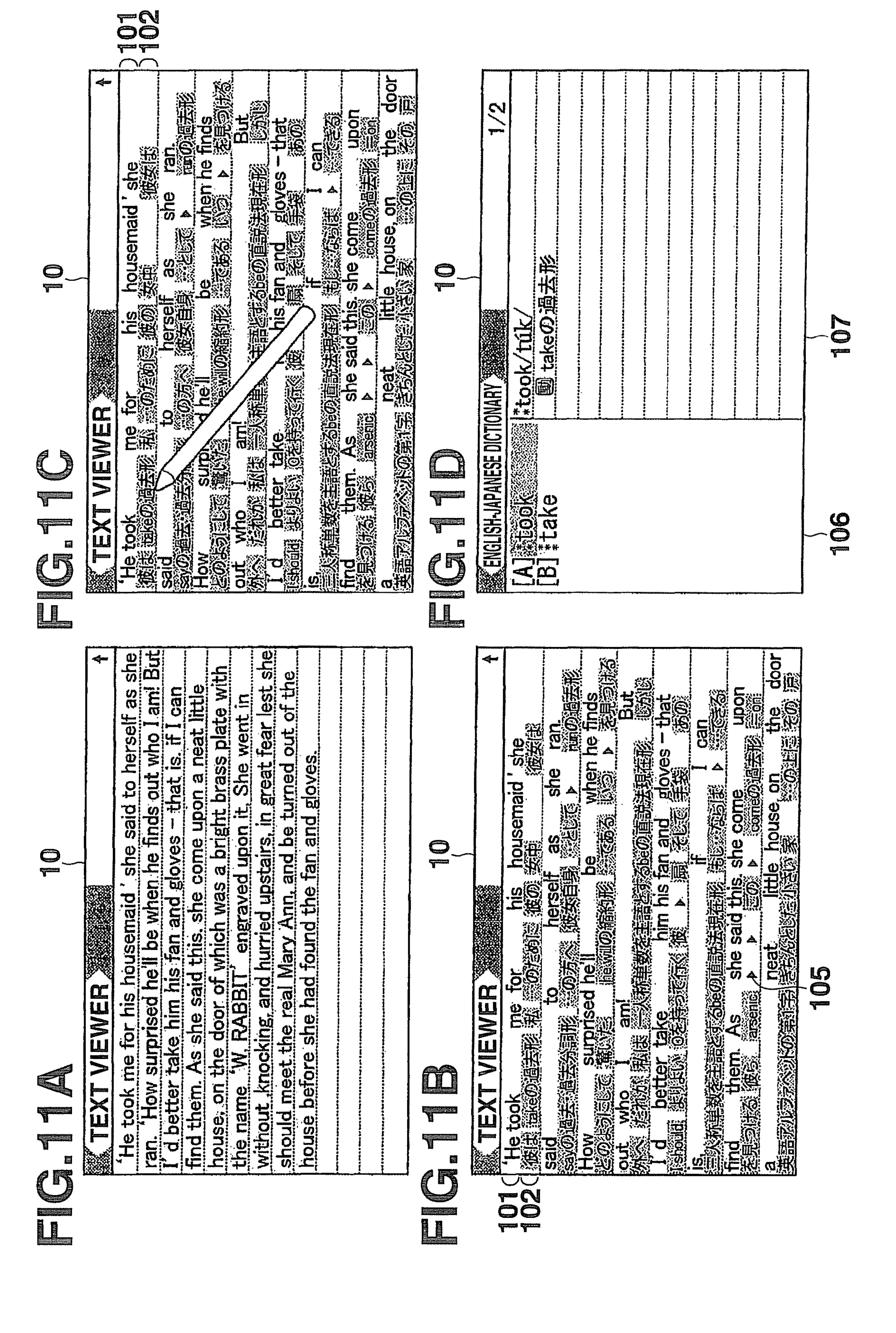
FIG. 11A is a diagram showing a display content of the display section.
FIG. 11B is a diagram showing a display content of the display section.
FIG. 11C is a diagram showing a display content of the display section.
FIG. 11D is a diagram showing a display content of the display section.

First, as shown in FIG. 11A, when the English text data 830*b* of "Alice's Adventures in Wonderland" is specified as the specified text data 830S (step S1), the specified text data 830S is displayed on the main display 10 (step S2).

Next, when the text translation key 2*h* is operated (step S3; Yes), the first word to be displayed "He" is set as the specified word (step S4), and it is judged that the specified word "He" is not yet registered in the word/translated word table 84 (step T5; No). Next, the first headword "he" corresponding to the specified word "He" is searched from the dictionary database 820*a* of the English-Japanese dictionary and set as the specified headword and the description information of the first word meaning which is "彼は、. . . " (meaning "he") is read out from the dictionary database 820*a* (step T6). Next, among the read out description information, the description information of the portion before the first appearing symbol which is "彼は" is extracted as the translated word of the specified word (step T7), and as shown in FIG. 11B, the specified word "He", the specified headword "he", the translated word "彼は" and the highlight display color of the translated word "red" are registered in the word/translated word table 84 corresponded to each other (step T8, see first row of FIG. 4B). Also, the first mark S showing the first word meaning of the first headword is extracted as the translated word is registered in the word/translated word table 84 added to the translated word.

Next, the specified word "He" is displayed in the original text display line 101 (step T9). Also, based on the information of the word/translated word table 84, the translated word "彼は" corresponding to the specified word "He" is displayed highlighted with the highlight display color "red" in a position near the specified word "He" in the translated word display line 102 (step T10). In FIG. 11, and later described FIG. 12 and FIG. 13, for the purpose of illustration, the highlight display in red, blue and green is shown with different types of hatching.

Subsequently, similarly, the word "took", "me", etc. in the specified text data 830S is displayed in the original text display line 101 (step T9) and the translated word is displayed highlighted with the highlight display color "red" in the translated word display line 102 (step T10) to display the word or the translated word until the end of the display position on the main display 10 (step T12; Yes).

When a word which appears a second time in the specified text data 830S, for example, "she" is specified as the specified word (step T11), it is judged that the word "she" which is the same type of word as the specified word "she" is registered in the word/translated word table 84 (step T5; Yes). The specified word "she" is displayed in the original text display line 101 (step T13) and it is judged that the translated word of the specified word "she" is not the translated word after change by the user (step T14; No) and the previously presented mark 105 is displayed in a position near the specified word "she" in the translated word display line 102 (step T15).

Next, as shown in FIG. 11C, FIG. 11D, FIG. 12A and FIG. 12B, when the translated word of the word "took" which is "take の過去形" (meaning "past tense of take") is touched (step T21), after the word "took" in the position corresponding to the touched position is set as the specified word, corresponding headwords "took" and "take" are searched from the dictionary database 820*a* and displayed in a list (step T22). Then, when the headword "take" is selected as the selected headword (step T23), the description information of the selected headword "take" is searched from the dictionary database 820*a* and displayed on the main display 10. Also, among the description information of the first word meaning, the portion selected as the translated word which is "Oを持っていく" (meaning to hold and bring O) is displayed with highlight in red and among the description information of the second and after word meanings, the portion which can be selected as a second type of translated word is displayed with highlight in blue.

Figure 12A:
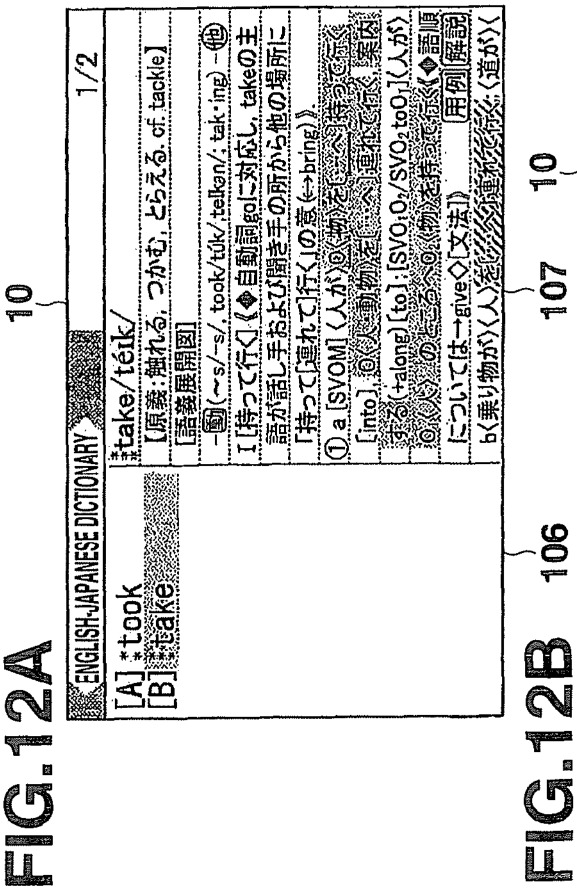
FIG. 12A is a diagram showing a display content of the display section.
Figure 12B:
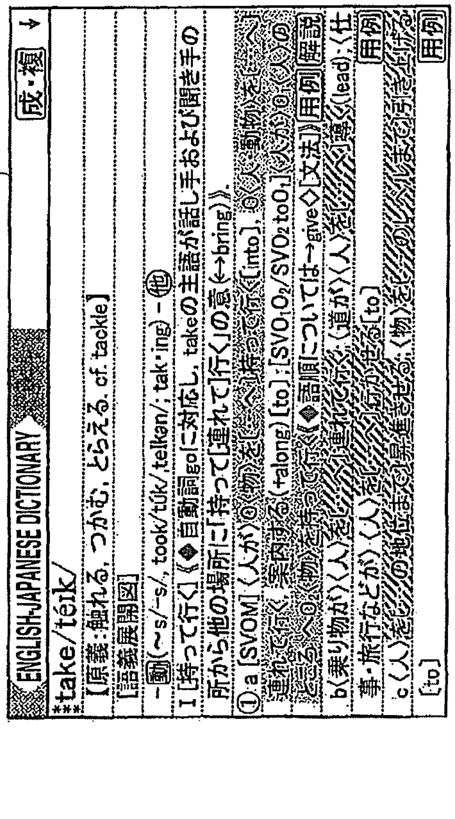
FIG. 12B is a diagram showing a display content of the display section.
Figure 12C:
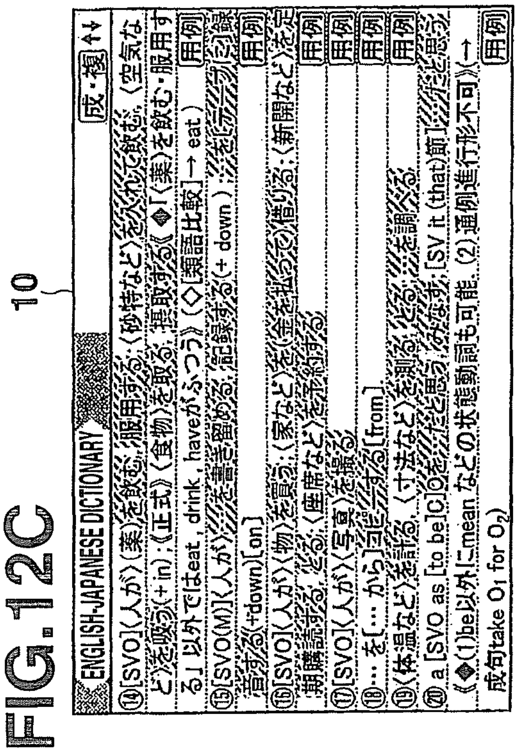
FIG. 12C is a diagram showing a display content of the display section.

Next, as shown in FIG. 12C, when the page forwarding operation is performed (step T25; Yes), the display object portion of the description information is scrolled forward or backward according to the instruction direction and among the description information displayed on the main display 10, the portion which can be selected as the translated word after change is displayed with highlight in blue (step T26).

Figure 12D:
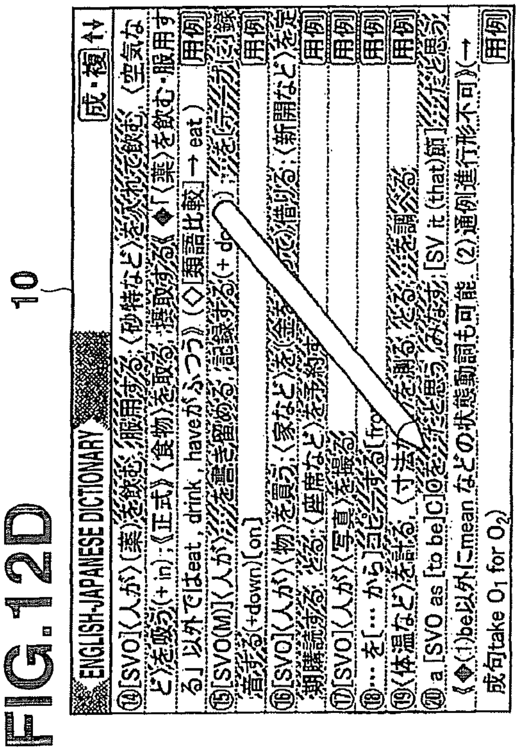
FIG. 12D is a diagram showing a display content of the display section.

Next, as shown in FIG. 12D, when the word meaning "O を . . . だと思う" (meaning "to think O is . . . ") in the description information is selected (step T27), the translated word information corresponding to the specified word "took" is updated in the word/translated word table 84 and the specified headword is "take", the translated word is "Oを だと思う" and highlight display color of the translated word is "blue" (step T28, see second row of FIG. 4B).

Next, as shown in FIG. 13A, the display content of the main display 10 is returned to the state of step T21 to display the specified text data 830S and the translated word (step T29) and based on the information in the word/translated word table 84, the display content of the main display 10 is updated (step T30). Specifically, the content of the translated word of the specified word "took" is replaced from "takeの過去形" to "Oを . . . だと思う" and displayed with discrimination in the corresponding highlight display color (blue). Also, the display position of each word after the specified word "took" is adjusted to the left or the right according to the length of the translated word after change which is "Oを . . . だと思う" and the spaces between the specified word "took" and the words before and after are adjusted. It is judged that there is the word "take" corresponding to the headword "take" which is the same as the specified word "took" in a portion after the specified word "took" and the translated word "Oを持っていく" displayed for the word "take" is changed to the previously presented mark 105 (step T31).

Next, when the previously presented mark 105 in a position near the word "take" is touched (step T41; Yes), as shown in FIG. 13B, the word "take" in a position corresponding to the touched position is set as the specified word, translated words "Oを持っていく" and "Oを . . . だと思う" corresponding to the headword "take" which is the same as the specified word "take" in the word/translated word table 84 are extracted to be displayed in a list on the main display 10 and selection button 104 to select the translated words is displayed in a position near the translated words (step T42). Also, a selection button 104 to search for a translated word different from the translated word displayed in the list is displayed.

Then, when the selection button to search for a different translated word is selected (step T43; Yes), the headword "take" corresponding to the specified word "take" is searched from the dictionary database 820*a* and displayed in a list (step T22). Then, when the headword "take" is selected as the selected head word (step T23), as shown in FIG. 13C, the description information of the selected headword "take" is searched from the dictionary database 820*a* and is displayed on the main display 10 (step T24 and T26). Also, among the description information of the first word meaning, the portion selected as the first type of translated word "Oを持っていく" is displayed with highlight in red and the portion selected as the second type of translated word "Oを . . . だと思う" is displayed with highlight in blue and the portion which can be selected as the third type of translated word, for example 〝を手に取る〞 (meaning "to hold in one's hand"), etc. is displayed with highlight in green.

Next, when the word meaning portion 〝を手に取る〞 in the description information is selected (step T27), as shown in FIG. 13B, the specified word "take", the specified headword "take", the translated word 〝を手に取る〞, the highlight display color "green" and the text word position information are registered corresponded to each other in the word/translated word table 84 (see sixth row of FIG. 4B).

Then, as shown in FIG. 13D, the display content of the main display 10 is returned to the state of step T21 to display the specified text data 830S and the translated word (step T29) and based on the information in the word/translated word table 84, the display content of the main display 10 is updated (step T30). Specifically, the content of the translated word of the specified word "take" is replaced from the previously presented mark 105 to "を手 に取る" and displayed with discrimination in the corresponding highlight display color (green). The display position of the words after the specified word "take" is adjusted to the left or right according to the length of the translated word after change 〝を手に取る〞 and the spaces between the specified word "take" and the words before and after are adjusted.

Next, as shown in FIG. 13E, when the translated word 〝を手に取る〞 of the position near the same word "take" is touched (step T21; Yes), after the word "take" in the position corresponding to the touched position is set as the specified word, the corresponding headword "take" is searched from the dictionary database 820*a* to be displayed in a list (step T22). Then, when the headword "take" is selected as the selected headword (step T23), the description information of the selected headword "take" is searched from the dictionary database 820*a* to be displayed on the main display 10 (step T24). Also, among the description information of the first word meaning, the portion selected as the first type of translated word "Oを 持っていく" is displayed with highlight in red, the portion selected as the second type of translated word "Oを . . . だと 思う" is displayed with highlight in blue, the portion selected as the third type of translated word 〝を手に取る〞 is displayed with highlight in green, and the portion which can be selected as the fourth type of translated word is displayed with highlight in another color not yet used.

Next, after the return key 2*g* is operated to return the display content of the main display 10 to the state shown in FIG. 13D, when the previously presented mark 105 in a position near the word "said" is touched (step T41; Yes), as shown in FIG. 13F, the word "said" of the position corresponding to the touched position is set as the specified word, the translated word "sayの過去形" (meaning "past tense of say") corresponded to the headword "said" which is the same as the specified word "said" in the word/translated word table 84 is extracted from the word/translated word table 84 to be displayed in a list on the main display 10 and a selection button 104 to select the translated word is displayed in a position near each translated word (step T42). Also, a selection button 104 to search for a translated word different from the translated word displayed in the list is displayed.

According to the electronic dictionary 1A, in addition to the advantageous effects which can be obtained from the electronic dictionary 1 of the first embodiment, as shown in step T10 of FIG. 9, step T30 of FIG. 10, FIG. 13A, FIG. 13D, etc., the changed translated word is displayed with discrimination in the color of highlight display with the text data 830 and the translated word displayed, and therefore, it is possible to easily discriminate on the display screen the translated word changed by the user.

Also, as shown in step T42 in FIG. 10, FIG. 13B and FIG. 13F, when any of the previously presented mark 105 is selected by the user, the previously presented word displayed in the position corresponding to the previously presented mark 105 is detected, and the translated word corresponding to the same headword as the previously presented word in the word/translated word table 84 is displayed in a list and the content of each translated word corresponding to the word of the same headword can be confirmed. Therefore, as for each word with the same headword, when the user has not changed the translated word, the user can confirm the content of the translated word and when the user individually changed the translated word, the user can confirm the content of each translated word.

As shown in steps T44, T30, etc. in FIG. 10, when any of the translated word displayed in a list is selected by the user as the translated word after change, the previously presented mark 105 is replaced by the translated word after change and the translated word after change is displayed. Therefore, the translated word of a previously presented word can be changed to the same translated word as the preceding word of the same type.

Also, as shown in step T10 in FIG. 9, step T30 in FIG. 10, FIG. 13D, etc., in a state where both the text data 830 and the translated word are displayed, based on the word/translated word table 84, a plurality of translated words corresponding to the same headword is displayed with discrimination of highlight in different colors according to content of the translated word. Therefore, when different translated words correspond to the same type of word, it is easy to confirm which word corresponds to which translated word.

Also, as shown in step T24 in FIG. 10, FIG. 13E, etc., in a state where the description information is displayed, based on the word/translated word table 84, among the description information, the portion used as the translated word is displayed with discrimination in the highlight display color. Therefore, it is easy to find the translated word of the word in the specified text data 830S from the description information.

The embodiments of the present invention are not limited to the above described embodiments and modifications can be made within the scope of the present invention.

For example, an electronic dictionary 1 is described as the electronic device of the present invention, however, the present invention can be applied to other such products and the present invention can be generally applied to electronic devices such as a cellular phone, a personal computer, a PDA (Personal Digital Assistant), game machine, etc. Also, the information display program 81 of the present embodiment can be stored in a memory card, a CD, etc. detachable from the electronic dictionary 1.

Also, in the above described step T24, it is described that when the description information of the selected headword is displayed, the portion used as the translated word is displayed with highlight, and in addition, when description information is displayed in normal searching processing where headword searching is performed by input of a string of characters to be searched, a portion used as the translated word in any of the text data 830 can be displayed with highlight.

Also, in step S21, step T21 and step T41 it is described that the translated word portion and previously presented mark 105 are selected by touching these portions. Alternatively, selection can be made by touching the word of the corresponding position in the original text display line 101.

Also, the text data 830 is described as English text, however, as long as the text data can be automatically extracted for each word, text of other languages can be used, such as German, French, Italian, Spanish, Russian, etc. Similarly, the language of the translated word is not limited to Japanese, and other languages can be used.

The entire disclosure of Japanese Patent Application No. 2009-184238 filed on Aug. 7, 2009 including specification, claims, drawings and abstract are incorporated herein by reference in its entirety.

Although various exemplary embodiments have been shown and described, the invention is not limited to the embodiments shown. Therefore, the scope of the invention is intended to be limited solely by the scope of the claims that follow.

According to an aspect of the preferred embodiments of the present invention, there is provided a text display apparatus including:

a display section;

a dictionary storage section to store dictionary information composed of a headword of a first language corresponded to description information of a second language;

a text storage section to store text data of the first language;

a text/translation display control section to display text data stored in the text storage section on the display section and to search description information of the headword corresponding to each word in the text data from the dictionary information to display a portion of the description information as an initial translated word in the second language in a position corresponding to each word;

a selection section to select a word of the text data or the translated word displayed on the display section by user operation;

a description information display control section to detect a word corresponding to the selected word or the selected translated word, and to search for description information of a headword corresponding to the word from the dictionary information to display the description information on the display section; and a translated word selection section to select a portion of the description information displayed by the description information display control section as a selected translated word by user operation, wherein the text/translation display control section includes a selected translated word discrimination display section to replace the initial translated word with the selected translated word and to display the selected translated word with a display form different from the initial translated word.

According to the above aspect, the specified text data is displayed in the first language and the description information of the headword corresponding to each word of the specified text data is searched from the dictionary information and at least a portion of the description information is displayed in a position corresponding to the word as the initial translated word in the second language. When any of the displayed text word or the translated word is selected by the user, the word corresponding to the selected word or the selected translated word is detected and the description information of the headword corresponding to the word is searched from the dictionary information to be displayed and the specific content of the word can be confirmed with the description information.

Then, when the user selects a portion of the description information as the selected translated word, the initial translated word is replaced by the selected translated word to be displayed and the translated word of the word in the specified text data can be changed from the translated word to be changed to the translated word after change. Therefore, the translated word displayed for the word in the text can be changed to a suitable translated word selected by the user.

Preferably, the text display apparatus, further includes:

a word/translated word storage section to store the word in the displayed text data corresponded to the translated word information of the word, wherein the translated word information includes a headword corresponding to the word in the text data from the headword in the dictionary information and the initial translated word or the selected translated word corresponding to the headword; and the text/translation display control section includes a previously presented mark display section to display a previously presented mark instead of the initial translated word of the word to represent the initial translated word of the same type of word as a previously presented word appearing a second or more time in the displayed text data, based on the word/translated word storage section.

Preferably, in the text display apparatus, the text/translation display control section displays with discrimination a plurality of the selected translated words corresponding to the same headword with a different display form according to content of the selected translated word based on the word/translated word storage section; and the description information display control section displays with discrimination with a different display form a portion selected as the selected translated word among the description information displayed on the display section.

Preferably, in the text display apparatus, the text/translation display control section:

alternately forms an original text display line to display a string of characters of an original text and a translated word display line to display a string of characters of the translated word on a display screen of the display section;

displays each word of the specified text data in the original text display line and the translated word of each word in the translated word display line in a position near the corresponding word; and adjusts space between the words in the original text display line according to a length of the translated word in the translated word display line.

According to an aspect of the preferred embodiments of the present invention, there is provided a recording medium recording a text display program readable by a computer to control a computer of a text display apparatus including a display section, to allow the computer to function as:

a dictionary storage section to store dictionary information composed of a headword of a first language corresponded to description information of a second language;

a text storage section to store text data of the first language;

a text/translation display control section to display text data stored in the text storage section on the display section and to search description information of the headword corresponding to each word in the text data from the dictionary information to display a portion of the description information as an initial translated word in the second language in a position corresponding to each word;

a selection section to select a word of the text data or the translated word displayed on the display section by user operation;

a description information display control section to detect a word corresponding to the selected word or the selected translated word, and to search for description information of a headword corresponding to the word from the dictionary information to display the description information on the display section;

a translated word selection section to select a portion of the description information displayed by the description information display control section as a selected translated word by user operation; and a selected translated word discrimination display section to replace the initial translated word with the selected translated word and to display the selected translated word with a display form different from the initial translated word.

What is claimed is:

1. A text display apparatus comprising:

a display section;

a dictionary storage section configured to store dictionary information that includes a plurality of headwords, wherein each headword of the plurality of headwords has corresponding description information in the dictionary information;

a text storage section configured to store text data including a plurality of words;

a text/translation display control section configured to (i) display the text data stored in the text storage section on the display section, (ii) search in the dictionary information for a headword corresponding to a word in the text data, and (iii) display a portion of the description information of the searched headword as an initial translated word such that the initial translated word is displayed in a position that corresponds to the word corresponding to the searched headword;

a selection section configured to select a word, in accordance with a user operation, as a specified word, wherein the specified word is from the text data displayed on the display section or wherein the specified word is the initial translated word;

a description information display control section configured to (i) search in the dictionary information for a headword corresponding to the specified word and (ii) display on the display section the description information of the headword corresponding to the specified word;

a translated word selection section configured to select, in accordance with a user operation, a portion of the description information displayed by the description information display control section as a selected translated word, wherein the text/translation display control section includes a selected translated word discrimination display section configured to (i) replace the initial translated word with the selected translated word and (ii) display the selected translated word with a display form different from a display form of the initial translated word;

a translated word storage section configured to store in correspondence with the translated word (i) the word corresponding to the specified word, and (ii) the initial translated word; and a detecting section configured to detect another occurrence of a word in the text data from the text storage section wherein the another occurrence is displayed by the text/translation display control section, wherein the another occurrence corresponds to the specified word and is stored by the translated word storage section, and the text/translation display control section comprises a mark display section configured to display a mark indicating that the another occurrence is another occurrence of a word for which an initial translated word has already been displayed, and wherein the mark is displayed for the another occurrence instead of displaying the initial translated word for the another occurrence.

2. The text display apparatus according to claim 1, wherein the translated word selection section is configured to select, in accordance with a user operation, different selected translated words for different occurrences of the word corresponding to the specified word, the text/translation display control section displays different selected translated words with display forms that are different from each other; and the description information display control section displays the description information of the headword corresponding to the specified word such that, if the different selected translated words are included in the description information, the different selected translated words are displayed with display forms that are different from each other.

3. A non-transitory recording medium recording a text display program readable by a computer to control a computer of a text display apparatus including a display section, to allow the computer to function as:

a dictionary storage section configured to store dictionary information that includes a plurality of headwords, wherein each headword of the plurality of headwords has corresponding description information in the dictionary information;

a text storage section configured to store text data including a plurality of words;

a text/translation display control section configured to (i) display the text data stored in the text storage section on the display section, (ii) search in the dictionary information for a headword corresponding to a word in the text data, and (ii) display a portion of the description information of the searched headword as an initial translated word such that the initial translated word is displayed in a position that corresponds to the word corresponding to the searched headword;

a selection section configured to select a word, in accordance with a user operation, as a specified word, wherein the specified word is from the text data displayed on the display section or wherein the specified word is the initial translated word;

a description information display control section configured to (i) search in the dictionary information for a headword corresponding to the specified word and (ii) to display on the display section the description information of the headword corresponding to the specified word;

a translated word selection section configured to select, in accordance with a user operation, a portion of the description information displayed by the description information display control section as a selected translated word;

a selected translated word discrimination display section configured to (i) replace the initial translated word with the selected translated word and (ii) display the selected translated word with a display form different from a display form of the initial translated word;

a translated word storage section configured to store in correspondence with the translated word (i) the word corresponding to the specified word, and (ii) the initial translated word; and a detecting section configured to detect another occurrence of a word in the text data from the text storage section wherein the another occurrence is displayed by the text/translation display control section, wherein the another occurrence corresponds to the specified word and is stored by the translated word storage section, and wherein the text/translation display control section comprises a mark display section configured to display a mark indicating that the another occurrence is another occurrence of a word for which an initial translated word has already been displayed, and wherein the mark is displayed for the another occurrence instead of displaying the initial translated word for the another occurrence.

* * * * *